US012626910B2

(12) United States Patent
Wu et al.

(10) Patent No.: US 12,626,910 B2
(45) Date of Patent: May 12, 2026

(54) COMPOSITE SILICON MATERIAL AND PREPARATION METHOD THEREFOR, NEGATIVE ELECTRODE PLATE, SECONDARY BATTERY, AND ELECTRICAL APPARATUS

(71) Applicant: CONTEMPORARY AMPEREX TECHNOLOGY CO., LIMITED, Ningde (CN)

(72) Inventors: Kai Wu, Ningde (CN); Zhipeng Cheng, Ningde (CN); Dongyang Shi, Ningde (CN); Ning Chen, Ningde (CN); Zhi Liu, Ningde (CN); Yaqian Deng, Ningde (CN); Yuzhen Wang, Ningde (CN)

(73) Assignee: CONTEMPORARY AMPEREX TECHNOLOGY CO., LTD., Ningde (CN)

( * ) Notice: Subject to any disclaimer, the term of this patent is extended or adjusted under 35 U.S.C. 154(b) by 0 days.

(21) Appl. No.: 19/304,647

(22) Filed: Aug. 20, 2025

(65) Prior Publication Data

US 2025/0391851 A1 Dec. 25, 2025

Related U.S. Application Data

(63) Continuation of application No. PCT/CN2024/089331, filed on Apr. 23, 2024.

(30) Foreign Application Priority Data

Sep. 6, 2023 (CN) .......................... 202311146150.9

(51) Int. Cl.
*H01M 4/36* (2006.01)
*H01M 4/38* (2006.01)
(Continued)

(52) U.S. Cl.
CPC ........... *H01M 4/366* (2013.01); *H01M 4/386* (2013.01); *H01M 4/483* (2013.01); *H01M 4/625* (2013.01);
(Continued)

(58) Field of Classification Search
None
See application file for complete search history.

(56) References Cited

U.S. PATENT DOCUMENTS

| | | | |
|---|---|---|---|
| 11,075,369 B2 * | 7/2021 | Kim ...................... | H01M 4/382 |
| 2020/0266444 A1 * | 8/2020 | Kim ...................... | H01M 4/366 |

(Continued)

FOREIGN PATENT DOCUMENTS

| | | | | |
|---|---|---|---|---|
| CN | 103840140 A | * | 6/2014 | ........ H01M 10/0525 |
| CN | 111129440 A | | 5/2020 | |

(Continued)

OTHER PUBLICATIONS

CN-103840140-A—machine translation (Year: 2014).*

(Continued)

*Primary Examiner* — Haroon S. Sheikh
(74) *Attorney, Agent, or Firm* — LADAS & PARRY LLP

(57) ABSTRACT

The composite silicon material includes an inner core and a silicon-containing cladding layer cladded on the outer side of the inner core. The inner core comprises a silicon-carbon material, the silicon-carbon material includes a porous conductive material and a first silicon-based material, the outer surface of the porous conductive material has pores, and at least a portion of the first silicon-based material is distributed in the pores. The silicon-containing cladding layer contains an ion-conducting material and a second silicon-based material. The second silicon-based material is dispersed in the ion-conducting material. At least a portion of the first silicon-based material is embedded in the pores of (Continued)

the porous conductive material, which can effectively alleviate the problem of silicon expansion; meanwhile, the ion-conducting material can increase the ion transmission path, thereby effectively alleviating the problem of poor dynamic performance caused by the small number of ion transmission paths of the silicon-carbon material.

19 Claims, 2 Drawing Sheets

(51) Int. Cl.
  *H01M 4/48* (2010.01)
  *H01M 4/62* (2006.01)
  *H01M 10/42* (2006.01)
(52) U.S. Cl.
  CPC .... *H01M 10/4235* (2013.01); *H01M 2220/20* (2013.01)

(56) References Cited

U.S. PATENT DOCUMENTS

| | | | | |
|---|---|---|---|---|
| 2024/0266495 A1* | 8/2024 | Zhong | .................... | C01B 33/02 |
| 2024/0274799 A1* | 8/2024 | Zhong | ................ | H01M 4/0428 |
| 2025/0038181 A1* | 1/2025 | Lee | ........................ | H01M 4/366 |
| 2025/0070148 A1* | 2/2025 | Wu | ...................... | H01M 4/0421 |
| 2025/0276900 A1* | 9/2025 | Li | ........................ | H01M 10/052 |

FOREIGN PATENT DOCUMENTS

| | | | |
|---|---|---|---|
| CN | 12382742 A | | 2/2021 |
| CN | 115188939 A | | 10/2022 |
| CN | 115911292 A | | 4/2023 |
| CN | 115986075 A | | 4/2023 |
| CN | 116014141 A | | 4/2023 |
| CN | 116230885 A | | 6/2023 |
| CN | 116259727 A | | 6/2023 |
| CN | 116454255 A | | 7/2023 |
| WO | 2018/040542 A1 | | 3/2018 |
| WO | 2022021933 A1 | | 2/2022 |

OTHER PUBLICATIONS

Written Opinion for PCT/CN2024/089331 mailed Jul. 5, 2024.
ISR for PCT/CN2024/089331 mailed Jul. 5, 2024.
Notice of Allowance dated Nov. 3, 2025 for application CN 202311146150.9.
Extended European Search Report for copending application 24861507.2 dated Mar. 26, 2026.

* cited by examiner

1

1

13

12
12

11

2

COMPOSITE SILICON MATERIAL AND PREPARATION METHOD THEREFOR, NEGATIVE ELECTRODE PLATE, SECONDARY BATTERY, AND ELECTRICAL APPARATUS

CROSS REFERENCE TO RELATED APPLICATIONS

The present application is a continuation of International application PCT/CN2024/089331 filed on Apr. 23, 2024 that claims priority from Chinese patent application No. 202311146150.9 filed on Sep. 6, 2023. The content of these applications is incorporated into the present application by reference in its entirety.

TECHNICAL FIELD

The present application relates to the technical field of secondary batteries, and in particular to a composite silicon material and a preparation method therefor, a negative electrode plate, a secondary battery, and an electrical apparatus.

BACKGROUND

Secondary batteries are widely used in various consumer electronic products and electric vehicles due to their outstanding characteristics of light weight, no pollution, memoryless effect and the like. With the continuous development of new energy industry, increasingly high requirements have been put forward for the energy density of secondary batteries.

Silicon-based negative electrode materials are widely used in secondary batteries due to their high capacity. However, due to the high expansion characteristics of silicon and its poor conductivity, while silicon-based negative electrode materials improve the energy density of secondary batteries, they also cause expansion and poor dynamics in secondary batteries, limiting the further development of battery technology.

SUMMARY OF THE INVENTION

Based on this, it is necessary to provide a composite silicon material and a preparation method therefor, a negative electrode plate, a secondary battery and an electrical apparatus to alleviate the expansion of secondary batteries and improve the dynamic performance of secondary batteries.

To achieve the aforementioned objective, a first aspect of the present application provides a composite silicon material, which includes:

an inner core, the inner core comprising a silicon-carbon material, the silicon-carbon material comprising a porous conductive material and a first silicon-based material, the porous conductive material having pores on its outer surface, and at least a portion of the first silicon-based material being distributed in the pores; and a silicon-containing cladding layer cladded on the outer side of the inner core, the silicon-containing cladding layer comprising an ion-conducting material and a second silicon-based material, and the second silicon-based material being dispersed in the ion-conducting material.

The composite silicon material of the present application includes a silicon-carbon material and a silicon-containing cladding layer. The silicon-carbon material includes a porous conductive material with pores on the outer surface and a first silicon-based material. At least a portion of the first silicon-based material is embedded in the pores of the porous conductive material, which can effectively alleviate the problem of silicon expansion. At the same time, the silicon-containing cladding layer contains an ion-conducting material, which can increase the ion transmission path, thereby effectively alleviating the problem of poor dynamic performance caused by the small number of ion transmission paths of the silicon-carbon material.

In some embodiments, the silicon-containing cladding layer has at least one of the following characteristics:

(1) the silicon-containing cladding layer has a thickness of 5 nm to 100 nm;

(2) the ion-conducting material comprises one or more of hard carbon, soft carbon, graphite, transition metal nitride, silicon-based alloy, tin-based alloy and lithium metal;

(3) the ion-conducting material and the second silicon-based material are compounded into silicon oxide;

(4) the volume average particle size Dv50 of the second silicon-based material is 2 nm to 20 nm;

(5) the second silicon-based material comprises one or more of elemental silicon and silicon-tin alloy; and (6) the shape of the second silicon-based material comprises one or more of the following: granular, linear, spherical, quasi-spherical, and sheet-like.

In some embodiments, the thickness of the silicon-containing cladding layer is 30 nm to 60 nm.

In some embodiments, the molar ratio of oxygen element to silicon element contained in the silicon oxide is denoted as x, $0 < x < 2$.

In some embodiments, $0 < x \leq 0.6$.

In some embodiments, the volume average particle size Dv50 of the second silicon-based material is 2 nm to 9 nm.

In some embodiments, the silicon-carbon material has at least one of the following characteristics:

(1) the mass percentage of silicon element in the silicon-carbon material is 3% to 25%;

(2) the pore size of the pores is 2 nm to 50 nm;

(3) the stacking height of the first silicon-based material in the pores is 1 nm to 35 nm;

(4) the shape of the silicon-carbon material comprises one or more of granular, spherical and quasi-spherical;

(5) the first silicon-based material comprises one or more of elemental silicon and silicon-tin alloy;

(6) the shape of the first silicon-based material comprises one or more of the following: granular, linear, spherical, quasi-spherical, and sheet-like; and (7) the porous conductive material comprises porous carbon.

In some embodiments, the mass percentage of silicon element in the silicon-carbon material is 8% to 10%.

In some embodiments, the pore size of the pores is 15 nm to 35 nm.

In some embodiments, the stacking height of the first silicon-based material in the pores is 15 nm to 25 nm.

In some embodiments, at least 3% of the first silicon-based material is embedded in the pores.

In some embodiments, all the first silicon-based material is embedded in the pores.

In some embodiments, the composite silicon material further includes a first carbon cladding layer, wherein the first carbon cladding layer is located between the substrate and the silicon-containing cladding layer.

In some embodiments, the first carbon cladding layer has at least one of the following characteristics:

(1) the first carbon cladding layer has a thickness of 10 nm to 30 nm; and (2) the material of the first carbon cladding layer comprises amorphous carbon.

In some embodiments, the composite silicon material further includes a second carbon cladding layer, wherein the second carbon cladding layer is cladded to an outer side of the silicon-containing cladding layer.

In some embodiments, the second carbon cladding layer has at least one of the following characteristics:

(1) the second carbon cladding layer has a thickness of 10 nm to 30 nm; and (2) the material of the second carbon cladding layer comprises amorphous carbon.

In some embodiments, the shape of the composite silicon material includes at least one of granular, spherical and quasi-spherical.

In some embodiments, the volume average particle size Dv50 of the composite silicon material is 3 μm to 22 μm.

In some embodiments, the volume average particle size Dv50 of the composite silicon material is 5 μm to 10 μm.

A second aspect of the present application provides a method for preparing the composite silicon material according to the first aspect of the present application, comprising the following steps:

preparing the silicon-carbon material; and forming the silicon-containing cladding layer on the outer side of the silicon-carbon material.

A third aspect of the present application provides a method for preparing the composite silicon material according to the first aspect of the present application, comprising the following steps:

preparing the silicon-carbon material;

forming a silicon dioxide cladding layer on the outer side of the silicon-carbon material to prepare an intermediate with a silicon dioxide cladding layer; and reducing the intermediate to form the silicon-containing cladding layer on the outer side of the silicon-carbon material.

In some embodiments, the silicon-carbon material is prepared by a vapor deposition method; the vapor deposition method includes at least one of the following conditions:

(1) the raw materials for preparing the silicon-carbon material comprise a porous conductive material and a first silicon source;

the molar ratio of the porous conductive material to the first silicon source is (3-8):1;

the first silicon source comprises monosilane; and the porous conductive material comprises porous carbon;

(2) the reaction temperature of the vapor deposition method is 800° C. to 900° C., and the reaction time is 2 h to 8 h; and (3) the reaction atmosphere of the vapor deposition method comprises an inert gas.

In some embodiments, a silicon dioxide cladding layer is formed on the outer side of the silicon-carbon material by a hydrothermal method; the hydrothermal method includes at least one of the following conditions:

(1) the raw materials for preparing the silicon dioxide cladding layer comprise a second silicon source;

the second silicon source comprises ethyl orthosilicate; and the mass ratio of the silicon-carbon material to the second silicon source is 3:(1-5);

(2) the reaction temperature of the hydrothermal method is 110° C. to 130° C., and the reaction time is 0.5 h to 5 h; and (3) the reaction medium of the hydrothermal method includes a mixture of ethanol and water; and the volume ratio of ethanol to water in the mixture is (2-4):1.

In some embodiments, the intermediate is reduced by magnesiothermic reduction; the magnesiothermic reduction method includes at least one of the following conditions:

(1) the reducing agent used includes magnesium powder; and the mass ratio of the intermediate to the magnesium powder is (2-4):1; and (2) the reaction temperature of the magnesiothermic reduction method is 600° C. to 750° C., and the reaction time is 0.5 h to 10 h.

In some embodiments, before the step of forming a silicon dioxide cladding layer on the outer side of the silicon-carbon material, the method further includes: using a first carbon source to prepare a first carbon cladding layer on the outer side of the silicon-carbon material;

the preparation of the first carbon cladding layer comprises at least one of the following conditions:

(1) the first carbon source comprises acetylene;

(2) further adding a first dilution gas when preparing the first carbon cladding layer, wherein the first dilution gas comprises argon gas; and the volume ratio of the first carbon source to the first dilution gas is (0.5-2):9; and (3) the reaction temperature is 600° C. to 800° C., and the reaction time is 0.5 h to 2 h.

In some embodiments, the preparation method further includes: using a second carbon source to form a second carbon cladding layer on the outer side of the silicon-containing cladding layer;

the preparation of the second carbon cladding layer comprises at least one of the following conditions:

(1) the second carbon source comprises acetylene;

(2) further adding a second dilution gas when preparing the second carbon cladding layer, wherein the second dilution gas comprises argon gas; and the volume ratio of the second carbon source to the second dilution gas is (0.5-2):9; and (3) the reaction temperature is 600° C. to 800° C., and the reaction time is 0.5 h to 2 h.

A fourth aspect of the present application provides a negative electrode plate, including:

a negative electrode current collector; and a negative electrode active material layer located on at least one side of the negative electrode current collector, wherein the negative electrode active material layer includes the composite silicon material of the first aspect of the present application or the composite silicon material prepared by the method of the second aspect of the present application or the method of the third aspect of the present application.

A fifth aspect of the present application provides a secondary battery including the negative electrode plate according to the fourth aspect of the present application.

A sixth aspect of the present application provides an electrical apparatus including the secondary battery according to the fifth aspect of the present application.

DESCRIPTION OF DRAWINGS

In order to provide a clearer explanation of the technical solution of the present application, a brief introduction will be given to the accompanying drawings used in the present application. It is evident that the accompanying drawings described below are only some embodiments of the present application. For those of ordinary skill in the art, other accompanying drawings can also be obtained based on the drawings without any creative effort.

DESCRIPTION OF REFERENCE NUMERALS

Figure 1:
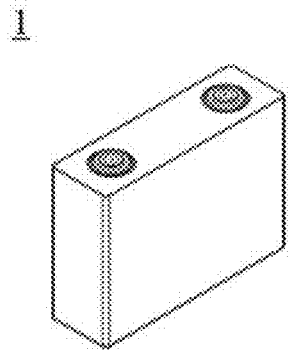
FIG. 1 is a schematic diagram of a secondary battery according to an embodiment of the present application.

1. secondary battery; 11. case; 12. electrode assembly; 13. cover plate; and 2. electrical apparatus.

DETAILED DESCRIPTION

For ease of understanding of the present application, the present application will be described below more completely with reference to the accompanying drawings. The accompanying drawings provide preferred embodiments of the present application. However, the present application can be implemented in various forms and is not limited to the embodiments described herein. On the contrary, these embodiments are provided for the purpose of more thoroughly and completely understanding the content disclosed by the present application.

Unless otherwise defined, all technical and scientific terms used herein have the same meanings as commonly understood by those skilled in the field to which the present application belongs. Herein, the terms used in the specification of the present application are only for the purpose of describing specific embodiments and are not intended to limit the present application.

In the present application, the technical features described in an open manner include closed technical solutions composed of the listed features, and also include open technical solutions containing the listed features.

In the present application, when referring to a numerical range, unless otherwise specified, the numerical range is deemed to be continuous and includes the minimum and maximum values of the range, and every value between the minimum and maximum values. Further, when a range refers to integers, every integer between the minimum and maximum values of the range is included. Furthermore, where multiple ranges are provided to describe a feature or characteristic, the ranges can be combined. In other words, unless otherwise indicated, all ranges disclosed herein are to be understood to encompass any and all sub-ranges subsumed therein.

In the present application, if a unit involving a data range is only followed by the right endpoint, it means that the units of the left endpoint and the right endpoint are identical. For example, 10-1000 nm means that the units of the left end point "10" and the right end point "1000" are both nm (nanometers).

The "plurality" involved in the present application, unless otherwise specified, refers to a number greater than 2 or equal to 2. For example, the "plurality" means greater than or equal to two. Only certain numerical ranges are explicitly disclosed herein. However, any lower limit can be combined with any upper limit to form a range not explicitly recited; and any lower limit can be combined with another lower limit to form a range not explicitly recited, and likewise, any upper limit can be combined with any another upper limit to form a range not explicitly recited. Additionally, each individually disclosed point or single numerical value may itself serve as a lower or upper limit to form a range not explicitly recited by combining with any other point or single numerical value, or with other lower or upper limits.

The "ranges" disclosed in the present application are defined in the form of lower and upper limits. A given range is defined by selecting a lower limit and an upper limit, and the selected lower and upper limits define the boundaries of the particular range. A range defined in this manner may be inclusive or exclusive of the end values.

The temperature parameters in this application, unless otherwise specified, allow for both constant temperature treatment and treatment within a certain temperature range. The thermostatic treatment described allows the temperature to fluctuate within the precision of the instrument control.

Unless otherwise specified, all embodiments and optional embodiments of the present application may be combined with each other to form new technical solutions. Unless otherwise specified, all technical features and optional technical features of the present application may be combined with each other to form new technical solutions.

Unless otherwise particularly stated, all steps in the present application may be performed sequentially or may be performed randomly, and are preferably performed sequentially.

Silicon-based negative electrode materials are widely used in secondary batteries. However, due to the high expansion characteristics of silicon, its few ion transmission paths and poor conductivity, secondary batteries using silicon-based negative electrode materials in related technologies have problems of expansion and poor dynamic performance while improving energy density.

Based on the above problems, the present application combines a silicon-containing cladding layer including an ion-conducting material and a silicon-carbon material. The silicon-carbon material includes a porous conductive material having pores on the outer surface and a first silicon-based material, and at least a portion of the first silicon-based material is embedded in the pores. The pores can provide space for the expansion of the first silicon-based material, thereby alleviating the problem of an increase in the overall volume of the composite silicon material due to the expansion of the first silicon-based material; and the ion-conducting material in the silicon-containing cladding layer located on the outer side of the silicon-carbon material can increase the ion transmission path, thereby improving the dynamic performance of the composite silicon material.

The first aspect of the present application provides a composite silicon material, including an inner core and a silicon-containing cladding layer cladded on the outer side of the inner core; the inner core contains a silicon-carbon material, the silicon-carbon material includes a porous conductive material and a first silicon-based material, the outer surface of the porous conductive material has pores, and at least a portion of the first silicon-based material is distributed in the pores; the silicon-containing cladding layer contains an ion-conducting material and a second silicon-based material, and the second silicon-based material is dispersed in the ion-conducting material.

It should be noted that "the first silicon-based material" in the present application is used only for descriptive purposes, and can neither be construed as indicating or implying a relative importance or number, nor be construed as implicitly indicating the importance or number of indicated technical features.

A porous conductive material refers to a conductive material having pores on its outer surface and/or inside. The number of pores contained in the porous conductive material may be one or more. The first silicon-based material in the silicon-carbon material may be entirely distributed in the pores of the porous conductive material, or only a portion of the first silicon-based material may be distributed in the pores of the porous conductive material.

The ion-conducting material may include a material that has ion-conducting ability itself, or may include a material that can form a compound with ion-conducting properties after further reaction; for example, the ion-conducting material may include a material that can form a compound with ion-conducting properties during the battery charging process, etc., and is not specifically limited. The silicon-containing cladding layer can be a continuous and complete cladding layer or an incomplete cladding layer, wherein "complete" means that the material inside the silicon-containing cladding layer is completely cladded by the silicon-containing cladding layer, and the silicon-containing cladding layer completely isolates the material inside from the outside. "Incomplete" means that the material inside the silicon-containing cladding layer is not completely cladded by the silicon-containing cladding layer, and at least part of the material inside the silicon-containing cladding layer may be in contact with the outside of the silicon-containing cladding layer. Preferably, the silicon-containing cladding layer is a continuous and complete cladding.

It can be understood that the composite silicon material of the present application includes a silicon-carbon material and an ion-conducting material. The silicon-carbon material includes a porous conductive material with pores on the outer surface and a first silicon-based material. At least a portion of the first silicon-based material is embedded in the pores of the porous conductive material, which can effectively alleviate the problem of silicon expansion. At the same time, the ion-conducting material can increase the ion transmission path, thereby effectively alleviating the problem of poor dynamic performance caused by the small number of ion transmission paths of the silicon-carbon material. In addition, the fast charge capacity and cycling performance of the secondary battery can also be improved.

In some embodiments, the thickness of the silicon-containing cladding layer is 5 nm to 100 nm. When the thickness of the silicon-containing cladding layer is lower than the above range, the increase in the ion transmission path is limited and the dynamic performance of the composite silicon material is poor; when the thickness of the silicon-containing cladding layer is higher than the above range, the overall silicon content of the composite silicon material is too high, resulting in excessive expansion of the composite silicon material, which may then cause the SEI film on the surface of the composite silicon material to rupture, exposing new sites, and the electrolyte solution continuously repairs the SEI film at the damaged interface, thus consuming active lithium and affecting the cycling performance of the battery cell; at the same time, the expansion of the composite silicon material will deteriorate the energy density of the battery cell. By way of example, the thickness of the silicon-containing cladding layer may be but is not limited to 5 nm, 10 nm, 15 nm, 20 nm, 25 nm, 30 nm, 35 nm, 40 nm, 45 nm, 50 nm, 55 nm, 60 nm, 65 nm, 70 nm, 75 nm, 80 nm, 85 nm, 90 nm, 95 nm, 100 nm or a range between any two of the above values. Optionally, the thickness of the silicon-containing cladding layer is 30 nm to 60 nm.

As an example, the thickness of the above-mentioned silicon-containing cladding layer can be measured by transmission electron microscopy (TEM).

In some embodiments, the ion-conducting material includes one or more of hard carbon, soft carbon, graphite, transition metal nitride, silicon-based alloy, tin-based alloy and lithium metal.

In some embodiments, the ion-conducting material and the second silicon-based material are compounded into silicon oxide; silicon oxide refers to a compound containing both silicon and oxygen elements; when the ion-conducting material and the second silicon-based material can be compounded into silicon oxide, the ion-conducting material is silicon dioxide, and the second silicon-based material is dispersed in the ion-conducting material; during the charging process, silicon dioxide can undergo an electrochemical reaction with lithium released from the positive electrode active material to form lithium silicate having ion conductive properties.

In some optional embodiments, the molar ratio of oxygen element to silicon element contained in the silicon oxide is denoted as x, $0 < x < 2$. When the molar ratio of oxygen to silicon elements contained in silicon oxide is within the above range, the larger the value of x, the smaller the volume expansion of silicon oxide, but its gram capacity is also lower; the smaller the value of x, the higher the gram capacity of silicon oxide, but its volume expansion is also greater. As an example, the molar ratio of oxygen to silicon elements in silicon oxide may be but is not limited to 0.01, 0.05, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 1.95, 1.99 or a range between any two of the above values. Optionally, $0 < x \leq 0.6$. As an example, the molar ratio of oxygen to silicon elements contained in the silicon oxide mentioned above can be determined by the following method: perform X-ray energy dispersive spectroscopy (EDS) on the composite silicon material, deduct the silicon content in the silicon-carbon material, and qualitatively determine the x value in the silicon oxide.

It should be noted that "the second silicon-based material" in the present application is used only for descriptive purposes, and can neither be construed as indicating or implying a relative importance or number, nor be construed as implicitly indicating the importance or number of indicated technical features.

In some optional embodiments, the volume average particle size Dv50 of the second silicon-based material is 2 nm to 20 nm; when the volume average particle size Dv50 of the second silicon-based material is within the above range, the strain caused by different lithium concentrations is smaller, and the material can withstand greater strain without rupture; in addition, the second silicon-based material has a larger active specific surface area and relatively good dynamic performance. As an example, the volume average particle size Dv50 of the second silicon-based material can be but is not limited to 2 nm, 3 nm, 4 nm, 5 nm, 6 nm, 7 nm, 8 nm, 9 nm, 10 nm, 11 nm, 12 nm, 13 nm, 14 nm, 15 nm, 16 nm, 17 nm, 18 nm, 19 nm, 20 nm or a range between any two of the above values. Optionally, the volume average particle size Dv50 of the second silicon-based material is 2 nm to 9 nm.

As an example, the volume average particle size Dv50 of the second silicon-based material mentioned above can be measured by using a laser particle size analyzer with reference to GB/T 19077-2016 particle size distribution laser diffraction method, for example, using a Mastersizer 2000E laser particle size analyzer of Malvern Instruments Co., Ltd. in the UK.

In some embodiments, the second silicon-based material includes one or more of elemental silicon and silicon-tin alloy.

In some embodiments, the shape of the second silicon-based material includes one or more of the following: granular, linear, spherical, quasi-spherical, and sheet-like.

In some embodiments, the mass percentage of silicon element in the silicon-carbon material is 3% to 25%; when the mass percentage of silicon element in the silicon-carbon material is within the above range, the silicon-carbon material has a high gram capacity and its electrochemical performance is relatively stable, and the cycle life is better; when the silicon content proportion further increases, the conductivity of the silicon-carbon material particles drops sharply, thereby causing capacity attenuation. As an example, the mass percentage of silicon element in the silicon-carbon material can be but is not limited to 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, or a range between any two of the above values. Optionally, the mass percentage of silicon element in the silicon-carbon material is 8% to 10%.

As an example, the mass percentage of silicon element in the silicon-carbon material can be qualitatively determined using EDS energy spectrum.

In some embodiments, the pore size of pores of the porous conductive material is 2 nm to 50 nm; when the pore size of pores of the porous conductive material is within the above range, while providing expansion space, it can minimize the deterioration of the compacted density caused by the internal reserved pores in the porous conductive material, thereby improving the energy density. As an example, the pore size of pores of the porous conductive material can be but is not limited to 2 nm, 5 nm, 8 nm, 10 nm, 13 nm, 15 nm, 18 nm, 20 nm, 23 nm, 25 nm, 27 nm, 30 nm, 33 nm, 35 nm, 38 nm, 40 nm, 43 nm, 45 nm, 47 nm, 50 nm or a range between any two of the above values. Optionally, the pore size of pores of the porous conductive material is 15 nm to 35 nm.

It should be noted that when the porous conductive material has only a single pore, the pore size of the pore refers to the pore size of the single pore; when the porous conductive material has multiple pores, the pore size of the pores refers to the average pore size of the pores.

As an example, the above-mentioned pore size of pores can be measured with a specific surface area analysis tester in accordance with GB/T 19587-2017 gas adsorption BET method.

In some embodiments, the stacking height of the first silicon-based material in the pores is 1 nm to 35 nm; when the stacking height of the first silicon-based material in the pores is within the above range, the silicon-carbon material has a high gram capacity while its electrochemical performance is relatively stable and its cycle life is better; when the stacking height of the first silicon-based material in the pores is further increased, the conductivity of the silicon-carbon material particles drops sharply, thereby causing capacity attenuation. As an example, the stacking height of the first silicon-based material in the pores can be but is not limited to 1 nm, 3 nm, 5 nm, 8 nm, 10 nm, 13 nm, 15 nm, 17 nm, 20 nm, 23 nm, 25 nm, 28 nm, 30 nm, 33 nm, 35 nm or a range between any two of the above values. Optionally, the stacking height of the first silicon-based material in the pores is 15 nm to 25 nm.

It should be noted that the stacking height of the first silicon-based material in the pores refers to the stacking thickness of the first silicon-based material along the depth of the pores. When the first silicon-based material all falls into the same pore, the stacking height of the first silicon-based material in the pore is the height of the first silicon-based material stacked in the pore. When the first silicon-based material falls into multiple pores, the stacking height of the first silicon-based material in the pores is the average stacking height of the first silicon-based material in the pores.

As an example, the above-mentioned stacking height of the first silicon-based material in the pores can be measured by transmission electron microscopy (TEM).

As a possible implementation manner, the shape of the silicon-carbon material includes one or more of granular, spherical and quasi-spherical.

In some embodiments, the first silicon-based material includes one or more of elemental silicon and silicon-tin alloy.

In some embodiments, the shape of the first silicon-based material includes one or more of the following: granular, linear, spherical, quasi-spherical, and sheet-like.

In some embodiments, the porous conductive material includes porous carbon.

In some embodiments, at least 3% of the first silicon-based material is embedded in the pores.

Optionally, all the first silicon-based material is embedded in the pores; and the volume expansion degree of the composite silicon material can be further reduced.

As a possible implementation manner, the composite silicon material also includes a first carbon cladding layer, which is located between the substrate and the silicon-containing cladding layer; the first carbon cladding layer can act as a fast-charging ion ring, improving the dynamic performance of the composite silicon material, and reducing the contact between the silicon-carbon material and the electrolyte solution.

It should be noted that "the first carbon cladding layer" in the present application is used only for descriptive purposes, and can neither be construed as indicating or implying a relative importance or number, nor be construed as implicitly indicating the importance or number of indicated technical features.

In some optional implementation manners, the thickness of the first carbon cladding layer is 10 nm to 30 nm; when the thickness of the first carbon cladding layer is within the above range, the silicon-carbon material has a high gram capacity and its electrochemical performance is relatively stable and the cycle life is better; when the thickness of the first carbon cladding layer is further increased, the conductivity of the silicon-carbon material particles drops sharply, thereby causing capacity attenuation. As an example, the thickness of the first carbon cladding layer may be, but is not limited to: 10 nm, 11 nm, 12 nm, 13 nm, 14 nm, 15 nm, 16 nm, 17 nm, 18 nm, 19 nm, 20 nm, 21 nm, 22 nm, 23 nm, 24 nm, 25 nm, 26 nm, 27 nm, 28 nm, 29 nm, 30 nm or a range between any two of the above values.

As an example, the thickness of the above-mentioned first carbon cladding layer can be measured by transmission electron microscopy (TEM).

In some optional implementation manners, the material of the first carbon cladding layer includes amorphous carbon. Amorphous carbon is used as the material of the first carbon cladding layer. The first carbon cladding layer has better ion conductivity and can also block direct contact between the silicon-based material and the electrolyte solution, thereby reducing side reactions.

In some embodiments, the composite silicon material further includes a second carbon cladding layer, which is cladded on the outer side of the silicon-containing cladding layer; the second carbon cladding layer can act as a fast-charging ion ring, improving the dynamic performance of the composite silicon material, and reducing the contact between the silicon-containing cladding layer and the elec-trolyte solution.

It should be noted that "the second carbon cladding layer" in the present application is used only for descriptive pur-poses, and can neither be construed as indicating or implying a relative importance or number, nor be construed as implic-itly indicating the importance or number of indicated tech-nical features.

Optionally, the thickness of the second carbon cladding layer is 10 nm to 30 nm; when the thickness of the second carbon cladding layer is within the above range, the second carbon cladding layer has good ionic conductivity and high mechanical strength, can tolerate the expansion of the sili-con material to a large extent without rupture, and reduce the occurrence of side reactions. As an example, the thickness of the second carbon cladding layer may be, but is not limited to: 10 nm, 11 nm, 12 nm, 13 nm, 14 nm, 15 nm, 16 nm, 17 nm, 18 nm, 19 nm, 20 nm, 21 nm, 22 nm, 23 nm, 24 nm, 25 nm, 26 nm, 27 nm, 28 nm, 29 nm, 30 nm or a range between any two of the above values.

As an example, the thickness of the above-mentioned second carbon cladding layer can be measured by transmis-sion electron microscopy (TEM).

Optionally, the material of the second carbon cladding layer includes amorphous carbon. Amorphous carbon is used as the material of the second carbon cladding layer. The second carbon cladding layer has better ion conductivity and can also block direct contact between the silicon-based material and the electrolyte solution, thereby reducing side reactions.

In some possible embodiments, the shape of the compos-ite silicon material includes at least one of granular, spheri-cal and quasi-spherical.

In some optional implementation manners, the volume average particle size Dv50 of the composite silicon material is 3 μm to 22 μm; when the volume average particle size Dv50 of the composite silicon material is within the above range, the material has a greater compacted density and a great active specific surface area. As an example, the volume average particle size Dv50 of the composite silicon material can be but is not limited to 3 μm, 4 μm, 5 μm, 6 μm, 7 μm, 8 μm, 9 μm, 10 μm, 11 μm, 12 μm, 13 μm, 14 μm, 15 μm, 16 μm, 17 μm, 18 μm, 19 μm, 20 μm, 21 μm, 22 μm or a range between any two of the above values. Optionally, the volume average particle size Dv50 of the composite silicon material is 5 μm to 10 μm.

Dv50 refers to the particle size corresponding to the cumulative particle size distribution percentage of the sample volume reaches 50%. As an example, Dv50 can be conveniently tested by a laser particle size analyzer, such as the Mastersizer 2000E from Malvern Instruments Ltd. in the UK, with reference to a GB/T 19077-2016 particle size distribution laser diffraction method.

In some embodiments, the composite silicon material includes:

an inner core including a silicon-carbon material, wherein the silicon-carbon material includes a porous conduc-tive material and a first silicon-based material, the outer surface of the porous conductive material has pores, and at least a portion of the first silicon-based material is embedded in the pores; the mass percentage of silicon element in the silicon-carbon material is 3% to 25%, which can be 8% to 10%; the pore size of the pores is 2 nm to 50 nm, which can be 15 nm to 35 nm; the stacking height of the first silicon-based material in the pores is 1 nm to 35 nm, which can be 15 nm to 25 nm; the shape of the silicon-carbon material includes one or more of granular, spherical and quasi-spherical; the first silicon-based material includes one or more of elemental silicon and silicon-tin alloy; the shape of the first silicon-based material includes one or more of granular, linear, spherical, quasi-spherical and sheet-like; the porous conductive material includes porous carbon; and at least 3% of the first silicon granular silicon-based material is embedded in the pores;

a first carbon cladding layer located on at least a portion of the outer surface of the substrate, wherein the thickness of the first carbon cladding layer is 10 nm to 30 nm, and the material of the first carbon cladding layer includes amorphous carbon;

a silicon-containing cladding layer located on at least a portion of the outer surface of the first carbon cladding layer, wherein the silicon-containing cladding layer includes an ion-conducting material and a second sili-con-based material, and the second silicon-based mate-rial is dispersed in the ion-conducting material; the thickness of the silicon-containing cladding layer is 5 nm to 100 nm, which may be optionally 30 nm to 60 nm; the volume average particle size Dv50 of the second silicon-based material is 2 nm to 20 nm, which may be optionally 2 nm to 9 nm; the second silicon-based material includes one or more of elemental silicon and silicon-tin alloy; the shape of the second silicon-based material includes one or more of granular, linear, spherical, quasi-spherical and sheet-like; the ion-conducting material includes one or more of hard carbon, soft carbon, graphite, transition metal nitride, silicon-based alloy, tin-based alloy and lithium metal; or the ion-conducting material and the second silicon-based material are compounded into silicon oxide, and the molar ratio of oxygen element to silicon element contained in the silicon oxide is recorded as x, $0<x<2$, which may be optionally $0<x\leq0.6$; and a second carbon cladding layer located on at least a portion of the outer surface of the silicon-containing cladding layer, wherein the thickness of the second carbon cladding layer is 10 nm to 30 nm, and the material of the second carbon cladding layer includes amorphous carbon;

the shape of the composite silicon material includes one or more of granular, spherical and quasi-spherical; and the volume average particle size Dv50 of the composite silicon material is 3 μm to 22 μm, which may be optionally 5 μm to 10 μm.

The second aspect of the present application provides a method for preparing the composite silicon material of the first aspect, including the following steps: preparing a sili-con-carbon material; and forming a silicon-containing clad-ding layer on the outer side of the silicon-carbon material.

The third aspect of the present application provides a method for preparing the composite silicon material of the first aspect, including the following steps: preparing a sili-con-carbon material; forming a silicon dioxide cladding layer on the outer side of the silicon-carbon material to prepare an intermediate with a silicon dioxide cladding layer; and reducing the intermediate to form a silicon-containing cladding layer on the outer side of the silicon-carbon material.

In some embodiments, the silicon-carbon material is prepared by a vapor deposition method. The use of vapor deposition method to prepare silicon-carbon material is beneficial to increasing the proportion of the first silicon-based material embedded in the pores of the porous conductive material in the finally prepared silicon-carbon material, and can even allow all of the first silicon-based material to be deposited in the pores of the porous conductive material.

In some embodiments, the raw materials for preparing the silicon-carbon material include a porous conductive material and a first silicon source.

In some optional implementation manners, the molar ratio of the porous conductive material to the first silicon source is (3-8):1; as an example, the molar ratio of the porous conductive material to the first silicon source can be but is not limited to 3:1, 3.5:1, 4:1, 4.5:1, 5:1, 5.5:1, 6:1, 6.5:1, 7:1, 7.5:1, 8:1 or a range between any two of the above ratios.

In some optional implementation manners, the first silicon source includes monosilane.

In some optional implementation manners, the porous conductive material includes porous carbon.

In some embodiments, the reaction temperature of the vapor deposition method is 800° C. to 900° C.; for example, it can be but is not limited to 800° C., 810° C., 820° C., 830° C., 840° C., 850° C., 860° C., 870° C., 880° C., 890° C., 900° C. or a range between any two of the above values. The reaction time is 2 h to 8 h; for example, it can be but is not limited to 2 h, 2.5 h, 3 h, 3.5 h, 4 h, 4.5 h, 5 h, 5.5 h, 6 h, 6.5 h, 7 h, 7.5 h, 8 h or a range between any two of the above values.

In some embodiments, the reaction atmosphere of the vapor deposition method includes an inert gas; optionally, the reaction atmosphere of the vapor deposition method includes argon gas.

In some embodiments, a silicon dioxide cladding layer is formed on the outer side of the silicon-carbon material by a hydrothermal method.

In some optional implementation manners, the raw materials for preparing the silicon dioxide cladding layer include a second silicon source.

Optionally, the second silicon source includes ethyl orthosilicate.

Optionally, the mass ratio of the silicon-carbon material to the second silicon source is 3:(1-5); for example, it can be but is not limited to 3:1, 3:1.5, 3:2, 3:2.5, 3:3, 3:3.5, 3:4, 3:4.5, 3:5 or a range between any two of the above values.

As a possible implementation manner, the reaction temperature of the hydrothermal method is 110° C. to 130° C.; for example, it can be but is not limited to 110° C., 112° C., 115° C., 118° C., 120° C., 122° C., 125° C., 128° C., 130° C. or a range between any two of the above values. The reaction time is 0.5 h to 5 h; for example, it can be but is not limited to 0.5 h, 1 h, 1.5 h, 2 h, 2.5 h, 3 h, 3.5 h, 4 h, 4.5 h, 5 h or a range between any two of the above values.

In some embodiments, the reaction medium of the hydrothermal method includes a mixture of ethanol and water.

Optionally, the volume ratio of ethanol to water in the mixture is (2-4):1. As an example, the volume ratio of ethanol to water in the mixture can be but is not limited to 2:1, 2.3:1, 2.5:1, 2.7:1, 3:1, 3.3:1, 3.5:1, 3.8:1, 4:1 or a range between any two of the above values.

In some embodiments, the intermediate is reduced by magnesiothermic reduction.

As a possible implementation manner, the reducing agent used includes magnesium powder.

Optionally, the mass ratio of the intermediate to the magnesium powder is (2-4):1; as an example, the mass ratio of the intermediate to the magnesium powder can be but is not limited to 2:1, 2.3:1, 2.5:1, 2.7:1, 3:1, 3.3:1, 3.5:1, 3.8:1, 4:1 or a range between any two of the above values.

As a possible implementation manner, the reaction temperature of the magnesiothermic reduction method is 600° C. to 750° C.; for example, it can be but not limited to 600° C., 610° C., 620° C., 630° C., 640° C., 650° C., 660° C., 670° C., 680° C., 690° C., 700° C., 710° C., 720° C., 730° C., 740° C., 750° C. or a range between any two of the above values. The reaction time is 0.5 h to 10 h; for example, it can be but is not limited to 0.5 h, 1 h, 2 h, 3 h, 4 h, 5 h, 6 h, 7 h, 8 h, 9 h, 10 h or a range between any two of the above values.

In some embodiments, before the step of forming a silicon dioxide cladding layer on the outer side of the silicon-carbon material, the method further includes: using a first carbon source to prepare a first carbon cladding layer on the outer side of the silicon-carbon material.

Optionally, the first carbon source includes acetylene.

In some optional implementation manners, a first dilution gas is further added when preparing the first carbon cladding layer, and the first dilution gas includes an inert gas.

Optionally, the first dilution gas includes argon gas.

Optionally, the volume ratio of the first carbon source to the first dilution gas is (0.5-2):9; for example, it can be but is not limited to 0.5:9, 0.8:9, 1:9, 1.3:9, 1.5:9, 1.7:9, 2:9 or a range between any two of the above values.

In some embodiments, the reaction temperature for preparing the first carbon cladding layer is 600° C. to 800° C.; for example, it may be but is not limited to 600° C., 620° C., 650° C., 680° C., 700° C., 730° C., 750° C., 770° C., 800° C. or a range between any two of the above values. The reaction time is 0.5 h to 2 h; for example, it can be but is not limited to 0.5 h, 0.7 h, 1 h, 1.3 h, 1.5 h, 1.8 h, 2 h or a range between any two of the above values.

In some embodiments, a silicon dioxide cladding layer is formed on the outer side of the first carbon cladding layer by a hydrothermal method.

In some optional implementation manners, the raw materials for preparing the silicon dioxide cladding layer include a second silicon source.

Optionally, the second silicon source includes ethyl orthosilicate.

Optionally, the mass ratio of the silicon-carbon material cladded with the first carbon cladding layer to the second silicon source is 3:(1-5); for example, it can be but is not limited to 3:1, 3:1.5, 3:2, 3:2.5, 3:3, 3:3.5, 3:4, 3:4.5, 3:5 or a range between any two of the above values.

As a possible implementation manner, the reaction temperature of the hydrothermal method is 110° C. to 130° C.; for example, it can be but is not limited to 110° C., 112° C., 115° C., 118° C., 120° C., 122° C., 125° C., 128° C., 130° C. or a range between any two of the above values. The reaction time is 0.5 h to 5 h; for example, it can be but is not limited to 0.5 h, 1 h, 1.5 h, 2 h, 2.5 h, 3 h, 3.5 h, 4 h, 4.5 h, 5 h or a range between any two of the above values.

In some embodiments, the reaction medium of the hydrothermal method includes a mixture of ethanol and water.

Optionally, the volume ratio of ethanol to water in the mixture is (2-4):1. As an example, the volume ratio of ethanol to water in the mixture can be but is not limited to 2:1, 2.3:1, 2.5:1, 2.7:1, 3:1, 3.3:1, 3.5:1, 3.8:1, 4:1 or a range between any two of the above values.

In some embodiments, the preparation method further includes: using a second carbon source to form a second carbon cladding layer on the outer side of the silicon-containing cladding layer.

Optionally, the second carbon source includes acetylene.

In some optional implementation manners, a second dilution gas is further added when preparing the second carbon cladding layer, and the second dilution gas includes an inert gas.

Optionally, the second dilution gas includes argon gas.

Optionally, the volume ratio of the second carbon source to the second dilution gas is (0.5-2):9; for example, it can be but is not limited to 0.5:9, 0.8:9, 1:9, 1.3:9, 1.5:9, 1.7:9, 2:9 or a range between any two of the above values.

In some embodiments, the reaction temperature for preparing the second carbon cladding layer is 600° C. to 800° C.; for example, it may be but is not limited to 600° C., 620° C., 650° C., 680° C., 700° C., 730° C., 750° C., 770° C., 800° C. or a range between any two of the above values. The reaction time is 0.5 h to 2 h; for example, it can be but is not limited to 0.5 h, 0.7 h, 1 h, 1.3 h, 1.5 h, 1.8 h, 2 h or a range between any two of the above values.

It should be noted that "the first silicon source", "the second silicon source", "the first carbon source", "the second carbon source", "the first dilution gas" and "the second dilution gas" in the present application are used only for descriptive purposes, and can neither be construed as indicating or implying a relative importance or number, nor be construed as implicitly indicating the importance or number of indicated technical features.

It should be noted that when the ion-conducting material and the second silicon-based material can be compounded into silicon oxide, before the step of preparing the second carbon cladding layer, after the silicon-containing cladding layer is cladded, it can be mixed with a lithium supplement agent so that the silicon dioxide in the silicon-containing cladding layer and the lithium supplement agent undergo an electrochemical reaction to form lithium silicate with ion conductivity.

In some embodiments, the method for preparing a composite silicon material includes:

preparing a silicon-carbon material by a vapor deposition method using a porous conductive material and a first silicon source as raw materials; wherein the molar ratio of the porous conductive material to the first silicon source is (3-8):1, the first silicon source includes monosilane, the reaction temperature of the vapor deposition method is 800° C. to 900° C., the reaction time is 2 h to 8 h, and the reaction atmosphere of the vapor deposition method includes an inert gas;

using a first carbon source to prepare a first carbon cladding layer on the outer side of the silicon-carbon material; wherein the first carbon source includes acetylene; a first dilution gas is also added during the preparation of the first carbon cladding layer, the first dilution gas includes an inert gas; the first dilution gas includes argon gas, and the volume ratio of the first carbon source to the first dilution gas is (0.5-2):9; the reaction temperature is 600° C. to 800° C., and the reaction time is 0.5 h to 2 h;

forming a silicon dioxide cladding layer on the outer side of the silicon-carbon material cladded with the first carbon cladding layer by a hydrothermal method to prepare an intermediate with a silicon dioxide cladding layer; the raw material for preparing the silicon dioxide cladding layer includes a second silicon source; the second silicon source includes ethyl orthosilicate; the mass ratio of the silicon-carbon material cladded with the first carbon cladding layer to the second silicon source is 3:(1-5); the reaction temperature of the hydrothermal method is 110° C. to 130° C., and the reaction time is 0.5 h to 5 h; the reaction medium of the hydrothermal method includes a mixture of ethanol and water, and the volume ratio of ethanol to water in the mixture is (2-4):1;

reducing the intermediate by magnesiothermic reduction to form a silicon-containing cladding layer on the outer side of the first carbon cladding layer; the reducing agent used includes magnesium powder, and the mass ratio of the intermediate to the magnesium powder is (2-4):1; the reaction temperature of the magnesiothermic reduction method is 600° C. to 750° C., and the reaction time is 0.5 h to 10 h;

using a second carbon source to prepare a second carbon cladding layer on the outer side of the silicon-containing cladding layer; the second carbon source includes acetylene;

a second dilution gas is also added during the preparation of the second carbon cladding layer, the second dilution gas includes an inert gas; the second dilution gas includes argon gas, and the volume ratio of the second carbon source to the second dilution gas is (0.5-2):9; the reaction temperature is 600° C. to 800° C., and the reaction time is 0.5 h to 2 h.

In some embodiments, the method for preparing a composite silicon material includes:

placing a porous conductive material in a rotary kiln, adjusting the rotation speed to 1 r/min to 15 r/min, injecting a first silicon source at a flow rate of 0.1 L/min to 0.6 L/min for 10 min to 40 min, after the temperature is raised to 800° C. to 900° C., keeping the temperature for 2 h to 8 h to obtain a silicon-carbon material; after cooling, introducing argon gas into the rotary kiln for purging for 30 min, raising the temperature to 600° C. to 800° C. at 5° C./min to 15° C./min, and keeping the temperature for 0.5 h to 2 h; then switching the gas to a mixed gas of a first carbon source and a first dilution gas with a volume ratio of (0.5-2):9, and keeping the temperature for 30 min to 120 min to obtain C@Si—C after cooling;

dissolving the silicon-carbon material cladded with the first carbon cladding layer in 100 ml of an ethanol/water solution with a volume ratio of (2-4):1, adding a second silicon source, stirring fully for 30 min, adding the mixture into a 200 ml polytetrafluoroethylene-lined autoclave, heating to 110° C. to 130° C. and keeping for 0.5 h to 5 h, then naturally cooling to room temperature; centrifuging the obtained solution, repeatedly washing with anhydrous ethanol, and vacuum drying at 60° C. for 12 h to obtain SiO2@C@Si—C;

mixing the SiO2@first carbon cladding layer@silicon-carbon material and Mg powder at a mass ratio of (2-4):1, fully grinding and mixing in a mortar, heating in a 600° C.-750° C. tubular furnace in an inert gas atmosphere for 0.5 h to 10 h, cooling to room temperature, washing with 0.5 M hydrochloric acid to remove MgO and unreacted Mg, washing with deionized water to neutrality, and then vacuum drying at 70° C. for 12 h; then placing back into the rotary kiln, introducing argon gas for purging for 30 min, heating to 700° C. at 10° C./min, and then switching to a mixed gas of a second carbon source and a second dilution gas with a volume ratio of (0.5-2):9, keeping the temperature for 30 min to 120 min, and cooling to obtain a C/SiOx@C/Si—C composite material.

It should be noted that C@Si—C means that a first carbon cladding layer is cladded on the outer side of the silicon-carbon material; SiO2@C@Si—C means that a silicon dioxide cladding layer is further cladded on the outer side of the first carbon cladding layer; C/SiOx@C/Si—C means that a silicon-containing cladding layer is formed outside the first carbon cladding layer, and a second carbon cladding layer is formed outside the silicon-containing cladding layer.

The fourth aspect of the present application provides a negative electrode plate, including: a negative electrode current collector and a negative electrode active material layer located on at least one side of the negative electrode current collector, the negative electrode active material layer including the composite silicon material of the first aspect of the present application or the composite silicon material prepared by the method of the second aspect of the present application.

In the present application, the negative electrode plate made of the composite silicon material mentioned above has a significantly reduced rebound rate after full charge, indicating that the volume expansion degree of the negative electrode plate is significantly reduced.

For example, the negative electrode current collector has two surfaces opposite to each other in a thickness direction of the negative electrode current collector, and the negative electrode film layer is arranged on either or both of the two opposite surfaces of the negative electrode current collector.

In some embodiments, the negative electrode current collector can be a metal foil or a composite current collector. For example, as the metal foil, a copper foil can be used. The composite current collector can comprise a polymer material substrate layer and a metal layer formed on at least one surface of the polymer material substrate. The composite current collector can be formed by forming a metal material on the polymer material substrate. The metal material includes but is not limited to copper, copper alloy, nickel, nickel alloy, titanium, titanium alloy, silver, silver alloy, or the like. The polymer material substrate includes but is not limited to a substrate of polypropylene (PP), polyethylene terephthalate (PET), polybutylene terephthalate (PBT), polystyrene (PS), or polyethylene (PE).

In some embodiments, a negative electrode active material for batteries well known in the art can also be used as the negative electrode active material. For example, the negative active material may include at least one of the following materials: artificial graphite, natural graphite, soft carbon, hard carbon, a silicon-based material, a tin-based material, lithium titanate, and the like. The silicon-based material can be selected from at least one of elemental silicon, a silicon-carbon composite, and a silicon alloy. The tin-based material can be selected from at least one of elemental tin, a tin-oxygen compound, or a tin alloy. However, the present application is not limited to these materials. Other traditional materials that can be used as negative electrode active materials for batteries may also be used. One of these negative active materials may be used alone, or two or more of these positive active materials may be used in combination. The weight percentage of the negative electrode active material in the negative electrode film layer is 70-100 wt %, based on the total weight of the negative electrode film layer.

In some embodiments, the negative electrode film layer further comprises optionally a binder. The binder may be selected from at least one of styrene butadiene rubber (SBR), polyacrylic acid (PAA), sodium polyacrylate (PAAS), polyacrylamide (PAM), polyvinyl alcohol (PVA), sodium alginate (SA), polymethacrylic acid (PMAA), and carboxymethyl chitosan (CMCS). The weight percentage of the binder in the negative electrode film layer is 0-30 wt %, based on the total weight of the negative electrode film layer.

In some embodiments, the negative electrode film layer further comprises optionally a conductive agent. The conductive agent can be selected from at least one of superconducting carbon, acetylene black, carbon black, Ketjen black, carbon dots, carbon nanotubes, graphene, and carbon nanofibers. The weight percentage of the conductive agent in the negative electrode film layer is 0-20 wt %, based on the total weight of the negative electrode film layer.

In some embodiments, the negative electrode film layer further optionally comprises other agents, for example, a thickener (such as sodium carboxymethyl cellulose (CMC-Na)). The weight percentage of the other auxiliaries in the negative electrode film layer is 0-15 wt %, based on the total weight of the negative electrode film layer.

In some embodiments, the negative electrode plate can be prepared by the following steps: dispersing the components for preparing the negative electrode plate, such as the negative electrode active material, the conductive agent, the binder and any other component in a solvent (such as deionized water) to form a negative electrode slurry, wherein that solid content of the negative electrode slurry is 30-70 wt %, and the viscosity at room temperature is adjusted to 2000-10000 mPa·s; and applying two sides of the negative electrode current collector with the obtained negative electrode slurry, and performing processes of drying, cold pressing such as rolling, and the like to obtain the negative electrode plate. The unit area density of single-side applying of negative electrode powder is 75-160 g/1540.25 cm², and the compacted density of the negative electrode plate is 1.2-2.0 g/cm³.

A fifth aspect of the present application provides a secondary battery including the negative electrode plate according to the fourth aspect of the present application.

The secondary battery using the above-mentioned composite silicon material in the present application has improved fast charge capability and cycling performance.

Generally, the secondary battery comprises a positive electrode plate, a negative electrode plate, an electrolyte, and a separator. During the charging and discharging process of the battery, active ions are intercalated and deintercalated back and forth between the positive electrode plate and the negative electrode plate. The electrolyte plays a role in conducting ions between the positive electrode plate and negative electrode plate. The separator is arranged between the positive electrode plate and the negative electrode plate and mainly serves to prevent a short circuit between the positive and negative electrodes while allowing ions to pass through.

Positive Electrode Plate

The positive electrode plate comprises a positive electrode current collector and a positive electrode film layer arranged on at least one surface of the positive electrode current collector, and the positive electrode film layer comprises the positive electrode active material in the first aspect of the present application.

As an example, the positive electrode current collector has two surfaces opposite in its own thickness direction, and the positive electrode film layer is arranged on either one or both of the two opposite surfaces of the positive electrode current collector.

In some embodiments, the positive electrode current collector can be a metal foil or a composite current collector.

For example, as the metal foil, an aluminum foil can be used. The composite current collector can comprise a polymer material substrate layer and a metal layer formed on at least one surface of the polymer material substrate layer. The composite current collector can be formed by forming a metal material on the polymer material substrate. The metal material includes but is not limited to aluminum, an aluminum alloy, nickel, a nickel alloy, titanium, a titanium alloy, silver, and a silver alloy. The polymer material substrate includes but is not limited to one or more of polypropylene (PP), polyethylene terephthalate (PET), polybutylene terephthalate (PBT), polystyrene (PS), and polyethylene (PE).

In some embodiments, the lithium ion positive electrode active material may include a positive electrode active material for batteries well known in the art. By way of example, the positive electrode active material can comprise at least one of the following materials: a lithium-containing phosphate with an olivine structure, a lithium transition metal oxide, and respective modified compounds thereof. However, the present application is not limited to these materials, and other conventional materials that can be used as positive electrode active materials for batteries may also be used. Only a single one of or a combination of two or more of these positive electrode active materials can be used. Examples of lithium transition metal oxides may comprise, but are not limited to, at least one of a lithium-cobalt oxide (e.g., $LiCoO_2$), a lithium-nickel oxide (e.g., $LiNiO_2$), a lithium-manganese oxide (e.g., $LiMnO_2$ or $LiMn_2O_4$), a lithium-nickel-cobalt oxide, a lithium-manganese-cobalt oxide, a lithium-nickel-manganese oxide, a lithium-nickel-cobalt-manganese oxide (e.g., $LiNi_{1/3}Co_{1/3}Mn_{1/3}O_2$ (also abbreviated as $NCM_{333}$), $LiNi_{0.5}Co_{0.2}Mn_{0.3}O_2$ (also abbreviated as $NCM_{523}$), $LiNi_{0.5}Co_{0.25}Mn_{0.25}O_2$ (also abbreviated as $NCM_{211}$), $LiNi_{0.6}Co_{0.2}Mn_{0.2}O_2$ (also abbreviated as $NCM_{622}$), $LiNi_{0.8}Co_{0.1}Mn_{0.1}O_2$ (also abbreviated as $NCM_{811}$), a lithium-nickel-cobalt-aluminum oxide (e.g., $LiNi_{0.80}Co_{0.15}Al_{0.05}O_2$), a modified compound thereof, and the like. Examples of lithium-containing phosphates of olivine structure may comprise, but are not limited to, at least one of lithium iron phosphate (e.g., $LiFePO_4$ (also abbreviated as LFP)), lithium iron phosphate and carbon composites, lithium manganese phosphate (e.g., $LiMnPO_4$), lithium manganese phosphate and carbon composites, lithium iron manganese phosphate, and lithium iron manganese phosphate and carbon composites. The weight percentage of the positive electrode active material in the positive electrode film layer is 80-100 wt %, based on the total weight of the positive electrode film layer.

In some embodiments, the positive electrode film layer further comprises optionally a binder. As an example, the binder may comprise at least one of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and fluoroacrylate resin. The weight percentage of the binder in the positive electrode film layer is 0-20 wt %, based on the total weight of the positive electrode film layer.

In some embodiments, the positive electrode film layer further comprises optionally a conductive agent. As an example, the conductive agent may comprise at least one of superconducting carbon, acetylene black, carbon black, Ketjen black, carbon dot, carbon nanotube, graphene, and carbon nanofiber. The weight percentage of the conductive agent in the positive electrode film layer is 0-20 wt %, based on the total weight of the positive electrode film layer.

In some embodiments, the positive electrode plate may be prepared by: dispersing the above components, such as the positive electrode active material, the conductive agent, the binder and any other component, for preparing the positive electrode plate in a solvent (such as N-methyl pyrrolidone) to form a positive electrode slurry, wherein the solid content of the positive electrode slurry is 40-80 wt %, and the viscosity at room temperature is adjusted to 5000-25000 mPa·s; and applying both sides of the positive electrode current collector with the positive electrode slurry, drying, and cold pressing by a cold rolling mill to obtain the positive electrode plate; wherein the unit area density of single-side applying of positive electrode powder is 180-400 g/1540.25 $cm^2$, and the compacted density of the positive electrode plate is 3.0-3.6 $g/cm^3$, optionally 3.3-3.5 $g/cm^3$. The calculation formula for compacted density is:

$$\text{the compacted density} = \text{the applied area density}/(\text{the thickness of the electrode plate after pressing} - \text{the thickness of the current collector}).$$

Electrolyte

The electrolyte plays a role in conducting ions between the positive electrode plate and negative electrode plate. The type of the electrolyte is not specifically limited in the present application and can be selected according to requirements. For example, the electrolyte can be liquid, gelled, or all solid.

In some embodiments, the electrolyte is an electrolyte solution. The electrolyte solution comprises an electrolyte salt and a solvent.

In some embodiments, the electrolyte salt can be selected from one or more of lithium hexafluorophosphate ($LiPF_6$), lithium tetrafluoroborate ($LiBF_4$), lithium perchlorate ($LiClO_4$), lithium hexafluoroarsenate ($LiAsF_6$), lithium bis (fluorosulfonyl)imide (LiFSI), lithium bis(trifluoromethanesulfonyl)imide (LiTFSI), lithium trifluoromethanesulfonate (LiTFS), lithium difluoro (oxalato) borate (LiDFOB), lithium bis(oxalato) borate (LiBOB), lithium difluorophosphate ($LiPO_2F_2$), lithium difluoro bis(oxalato)phosphate (LiDFOP), and lithium tetrafluoro (oxalato)phosphate (LiTFOP). The concentration of the electrolyte salt is generally 0.5-5 mol/L.

In some embodiments, the solvent can be selected from one or more of fluoroethylene carbonate (FEC), ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), methylsulfonylmethane (MSM), ethyl methyl sulfone (EMS), and diethyl sulfone (ESE).

In some embodiments, the electrolyte solution further comprises optionally an additive. For example, the additive can include a negative electrode film-forming additive and a positive electrode film-forming additive and can further include additives that can improve some properties of the battery, for example, an additive that improves the overcharging performance of the battery and an additive that improves the high- or low-temperature performance of the battery.

Separator

In some embodiments, the secondary battery further comprises a separator. The type of the separator is not particularly limited in the present application, and any well-known separator with a porous structure having good chemical stability and mechanical stability can be selected.

In some embodiments, the material of the separator can be selected from at least one of glass fibers, non-woven fabric, polyethylene, polypropylene, and polyvinylidene fluoride. The separator can be either a single-layer thin film or a multilayer composite thin film without special limitations. When the separator is a multilayer composite thin film, the materials of the layers can be the same or different without special limitations.

In some embodiments, the thickness of the separator is 6-40 μm, optionally 12-20 μm.

In some embodiments, the positive electrode plate, the negative electrode plate, and the separator can be made into an electrode assembly by a winding process or a lamination process; and the electrode assembly and electrolyte are encapsulated by the packaging material for battery cells in the first aspect of the present application.

The shape of the secondary battery is not particularly limited in the present application, and the secondary battery can be cylindrical, prismatic, or in any other shape. For example, FIG. 1 is a secondary battery 1 with a prismatic structure as an example.

Figure 2:
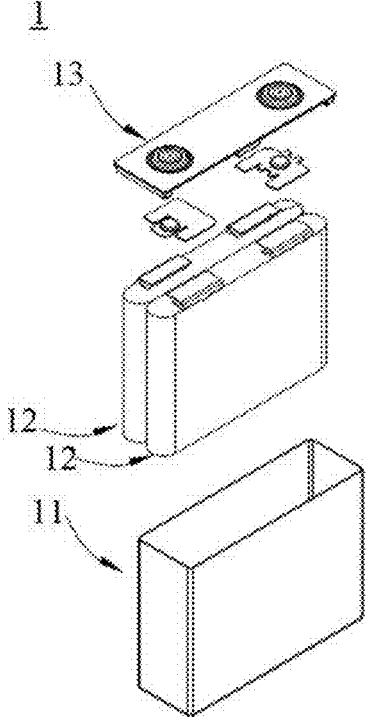
FIG. 2 is an exploded view of the secondary battery according to an embodiment of the present application shown in FIG. 1.

In some examples, referring to FIG. 2, the outer package can include a case 11 and a cover plate 13. The case 11 can comprise a bottom plate and a side plate connected to the bottom plate, and the bottom plate and the side plate enclose to form an accommodating cavity. The case 11 has an opening that communicates with the accommodating cavity, and the cover plate 13 may cover the opening to close the accommodating cavity.

The positive electrode plate, the negative electrode plate, and the separator can be made into an electrode assembly 12 by a winding process or a lamination process. The electrode assembly 12 is encapsulated within the accommodating cavity. An electrolyte solution infiltrates into the electrode assembly 12. The number of the electrode assembly 12 included in the lithium-ion battery 1 can be one or more, and can be adjusted according to requirements.

In some embodiments, the secondary battery can be assembled into a battery module, the number of secondary batteries included in the battery module can be multiple, and the specific number can be adjusted according to the application and capacity of the battery module.

In the battery module, a plurality of secondary batteries can be sequentially arranged along the length direction of the battery module. Of course, any other arrangements are also possible. The plurality of lithium-ion batteries may further be fixed by fasteners.

Optionally, the battery module may further include a shell having an accommodating space, in which the plurality of secondary batteries is accommodated in the accommodating space.

In some embodiments, the aforementioned battery modules may further be assembled into the battery pack, and the number of battery modules included in the battery pack may be adjusted according to the application and capacity of the battery pack.

The battery pack can include a battery box and a plurality of battery modules provided in the battery box. The battery box includes an upper box and a lower box, wherein the upper box can cover the lower box and forms an enclosed space for accommodating the battery module. The plurality of battery modules may be arranged in the battery box in any manner.

Electrical Apparatus

A sixth aspect of the present application provides an electrical apparatus including at least one selected from the secondary battery, battery module, or battery pack of the fifth aspect of the present application. The secondary battery, the battery module, or the battery pack may be used as a power source of the apparatus, or may be used as an energy storage unit of the apparatus. The apparatus can be, but is not limited to, a mobile device, an electric vehicle, an electric train, a ship and satellite, an energy storage system, or the like; among them, the mobile device may include, but is not limited to, at least one of a mobile phone, a laptop, or the like; the electric vehicle may include, but is not limited to, an all-electric vehicle, a hybrid electric vehicle, a plug-in hybrid electric vehicle, an electric bicycle, an electric scooter, an electric golf cart, an electric truck, or the like.

For the apparatus, the secondary battery, battery module or battery pack can be selected according to the use requirements of the apparatus.

Figure 3:
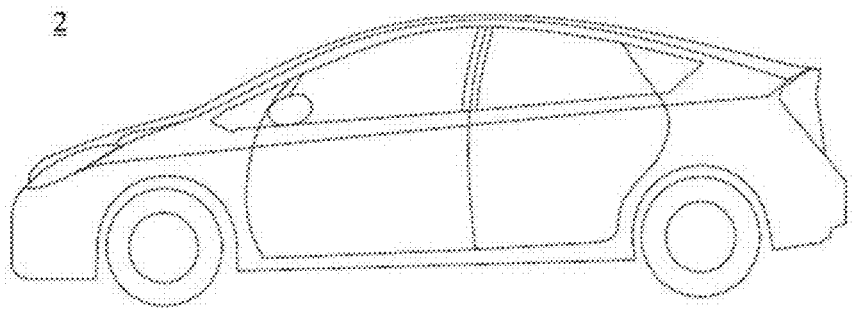
FIG. 3 is a schematic view of an electrical apparatus in which a secondary battery is used as a power source according to an embodiment of the present application.

FIG. 3 is an electrical apparatus 2 as an example. The electrical apparatus 2 is an all-electric vehicle, a hybrid electric vehicle, a plug-in hybrid electric vehicle, or the like. In order to satisfy the requirements of the apparatus for high power and high energy density of the secondary battery, a battery pack or a battery module can be employed.

The apparatus used as another example can be, for example, a mobile phone, a tablet computer, a laptop, etc. The apparatus is generally required to be light and thin, and can use a lithium-ion battery as a power source.

The beneficial effects of the present application are further illustrated below in conjunction with the embodiments.

To make the technical problems to be solved by the present application, the technical solutions, and the beneficial effects clearer, the following is further described below in detail with reference to embodiments and the accompanying drawings. It is clear that the described embodiments are only some, rather than all, of the embodiments of the present application. The following description of at least one exemplary embodiment is actually merely illustrative and by no means constitutes any limitation on the present application and the use thereof. All other embodiments obtained by those of ordinary skill in the art based on the embodiments of the present application without involving any creative effort shall fall within the scope of protection of the present application.

In embodiments in which no specific technologies or conditions are specified, technologies or conditions described in the literature in the art or product specifications are followed. The reagents or instruments used without manufacturer indicated are all commercially available conventional products.

I. Preparation of Composite Silicon Material

Example 1

The porous carbon was placed in a rotary furnace, the rotation speed was adjusted to 6 r/min, and in an argon gas atmosphere, monosilane with a purity of 99.99% (as the first silicon source) was injected at a flow rate of 0.2 L/min for 30 minutes, and the molar ratio of the porous carbon to the first silicon source was 4:1; after heating to 850° C., the temperature was kept for 4 hours for vapor deposition reaction to obtain a silicon-carbon material; after cooling, argon gas was introduced into the rotary furnace for purging for 30 minutes, the temperature was raised to 700° C. at 10° C./min, and then the gas was switched to a mixed gas of acetylene (as the first carbon source) and argon gas (as the first dilution gas) in a volume ratio of 1:9, and the temperature was kept for 30 minutes. After cooling, a first carbon cladding layer was formed on the outer side of the silicon-carbon material.

3 g of the above silicon-carbon material cladded with the first carbon cladding layer was weighed, dissolved in 100 mL of a mixed solution of ethanol and water in a volume ratio of 2:1, 2 g of ethyl orthosilicate (as a second silicon source) was added, stirred thoroughly for 30 minutes, and then the mixture was added to a 200 ml polytetrafluoroethylene-lined autoclave, heated to 120° C. and kept for 1 hour, and then cooled naturally to room temperature; the obtained solution was centrifuged, and repeatedly washed with anhydrous ethanol, and vacuum dried at 60° C. for 12 hours, that is, a silicon dioxide cladding layer was formed on the outer side of the first carbon cladding layer, to obtain an intermediate with a silicon dioxide cladding layer.

The above intermediate was mixed with magnesium powder (as a reducing agent) at a mass ratio of 3:1, fully ground and mixed in a mortar, heated in a 650° C. tubular furnace in an inert gas atmosphere for 2 hours for magnesiothermic reduction reaction, cooled to room temperature, washed with 0.5 M hydrochloric acid to remove MgO and unreacted magnesium powder, washed with deionized water to neutrality, and then vacuum dried at 70° C. for 12 hours to form a silicon-containing cladding layer on the outer side of the first cladding layer; the resultant was placed back to the rotary kiln, purged with argon gas for 30 minutes, heated to 700° C. at 10° C./min, and then the gas was switched to a mixed gas of acetylene (as a second carbon source) and argon gas (as a second dilution gas) in a volume ratio of 1:9, kept at that temperature for 30 minutes, and cooled to form a second carbon cladding layer on the outer side of the silicon-containing cladding layer, so as to obtain the composite silicon material.

Figure 4:
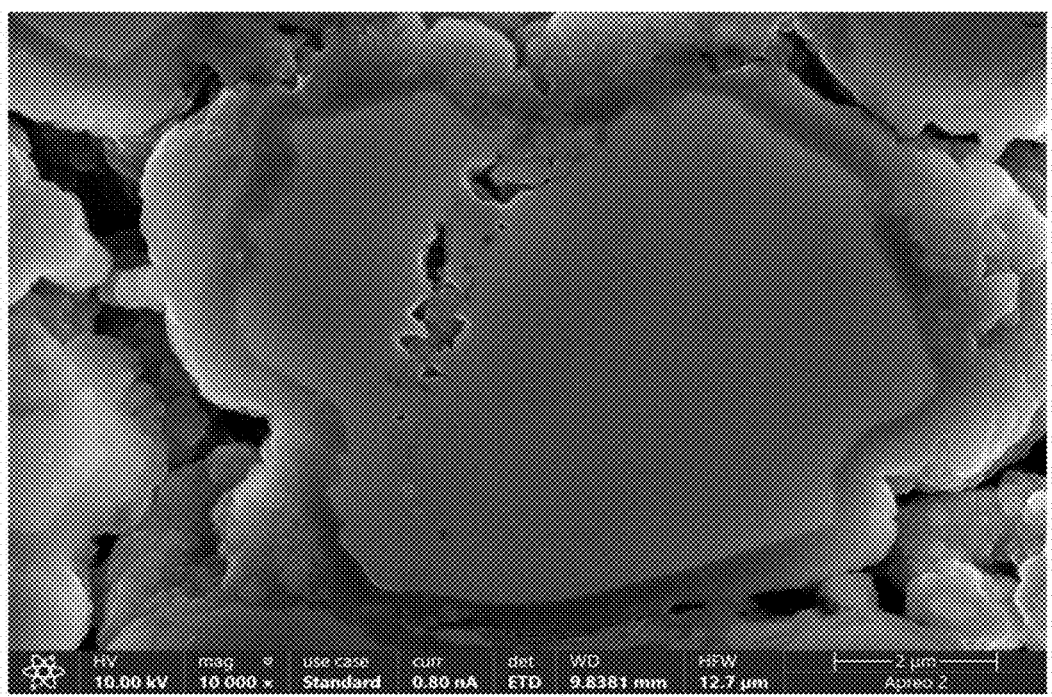
FIG. 4 is a SEM image of a cross section of the composite silicon material in Example 1.

The SEM image of the cross section of the composite silicon material prepared in Example 1 is shown in FIG. 4. As can be seen from FIG. 4, the composite silicon material has a cladding structure, in which the silicon-containing cladding layer is cladded on the outer side of the silicon-carbon material, the inner core material is a loading structure, the pores of the porous carbon contain elemental silicon (i.e., the first silicon-based material), and the cladding layer is a dispersed structure, in which elemental silicon (i.e., the second silicon-based material) is dispersed in the silicon dioxide matrix.

Examples 2-35

The preparation method of a composite silicon material in Examples 2-35 is basically similar to the preparation method of a composite silicon material in Example 1, and the main difference lies in that: at least one of the following is different: the type of the first silicon source, the molar ratio of porous carbon to the first silicon source, the temperature of the vapor deposition reaction, the time of the vapor deposition reaction, the type of the first carbon source, the type of the first dilution gas, the volume ratio of the first carbon source to the first dilution gas, the reaction temperature and/or time when preparing the first carbon cladding layer, the type of the second silicon source, the mass ratio of the silicon-carbon material cladded with the first carbon cladding layer to the second silicon source, the reaction temperature and/or time when preparing the silicon dioxide cladding layer, the type of the reducing agent for the magnesiothermic reduction reaction, the mass ratio of the intermediate with the silicon dioxide cladding layer to the reducing agent, the temperature and/or time of the magnesiothermic reduction reaction, the type of the second carbon source, the type of the second dilution gas, the volume ratio of the second carbon source to the second dilution gas, and the reaction temperature and/or time when preparing the second carbon cladding layer, as shown in Table 1 for details.

Comparative Example 1

The difference between Comparative Example 1 and Example 4 is that only the silicon-carbon material and the first cladding layer cladded on the outer side of the silicon-carbon material are prepared, as shown in Table 1-1 and Table 1-2 for details.

TABLE 1-1

| Group | Preparation of silicon-carbon material | | | Preparation of first carbon cladding layer | | | |
| | First silicon source | n1 | Temperature and time | First carbon source | First dilution gas | v1 | Temperature and time |
| --- | --- | --- | --- | --- | --- | --- | --- |
| Example 1 | $SiH_4$ | 4:1 | 850° C., 4 h | Acetylene | Argon gas | 1:9 | 750° C., 1 h |
| Example 2 | $SiH_4$ | 4:1 | 850° C., 4 h | Acetylene | Argon gas | 1:9 | 750° C., 1 h |
| Example 3 | $SiH_4$ | 4:1 | 850° C., 4 h | Acetylene | Argon gas | 1:9 | 750° C., 1 h |
| Example 4 | $SiH_4$ | 4:1 | 850° C., 4 h | Acetylene | Argon gas | 1:9 | 750° C., 1 h |
| Example 5 | $SiH_4$ | 4:1 | 850° C., 4 h | Acetylene | Argon gas | 1:9 | 750° C., 1 h |
| Example 6 | $SiH_4$ | 4:1 | 850° C., 4 h | Acetylene | Argon gas | 1:9 | 750° C., 1 h |
| Example 7 | $SiH_4$ | 4:1 | 850° C., 4 h | Acetylene | Argon gas | 1:9 | 750° C., 1 h |
| Example 8 | $SiH_4$ | 8:1 | 850° C., 1 h | Acetylene | Argon gas | 1:9 | 750° C., 1 h |
| Example 9 | $SiH_4$ | 8:1 | 850° C., 2 h | Acetylene | Argon gas | 1:9 | 750° C., 1 h |
| Example 10 | $SiH_4$ | 5:1 | 850° C., 4 h | Acetylene | Argon gas | 1:9 | 750° C., 1 h |
| Example 11 | $SiH_4$ | 4:1 | 850° C., 4.5 h | Acetylene | Argon gas | 1:9 | 750° C., 1 h |
| Example 12 | $SiH_4$ | 3:1 | 850° C., 8 h | Acetylene | Argon gas | 1:9 | 750° C., 1 h |
| Example 13 | $SiH_4$ | 3:1 | 850° C., 10 h | Acetylene | Argon gas | 1:9 | 750° C., 1 h |
| Example 14 | $SiH_4$ | 4:1 | 850° C., 4 h | Acetylene | Argon gas | 1:9 | 750° C., 1 h |
| Example 15 | $SiH_4$ | 4:1 | 850° C., 4 h | Acetylene | Argon gas | 1:9 | 750° C., 1 h |
| Example 16 | $SiH_4$ | 4:1 | 850° C., 4 h | Acetylene | Argon gas | 1:9 | 750° C., 1 h |
| Example 17 | $SiH_4$ | 4:1 | 850° C., 4 h | Acetylene | Argon gas | 1:9 | 750° C., 1 h |
| Example 18 | $SiH_4$ | 4:1 | 850° C., 4 h | Acetylene | Argon gas | 1:9 | 750° C., 1 h |
| Example 19 | $SiH_4$ | 4:1 | 850° C., 4 h | Acetylene | Argon gas | 1:9 | 750° C., 1 h |
| Example 20 | $SiH_4$ | 4:1 | 850° C., 4 h | Acetylene | Argon gas | 1:9 | 750° C., 1 h |

TABLE 1-1-continued

| | Preparation of silicon-containing cladding layer | | | | | Preparation of second carbon cladding layer | | | |
|---|---|---|---|---|---|---|---|---|---|
| Group | Second silicon source | n2 | Temperature and time | Reducing agent | n3 | Temperature and time | Second carbon source | Second dilution gas | v2 | Temperature and time |
| Example 1 | Ethyl orthosilicate | 3:2 | 120° C., 0.3 h | Mg | 3:1 | 650° C., 4 h | Acetylene | Argon gas | 1:9 | 750° C., 1 h |
| Example 2 | Ethyl orthosilicate | 3:2 | 120° C., 0.5 h | Mg | 3:1 | 650° C., 4 h | Acetylene | Argon gas | 1:9 | 750° C., 1 h |
| Example 3 | Ethyl orthosilicate | 3:2 | 120° C., 2 h | Mg | 3:1 | 650° C., 4 h | Acetylene | Argon gas | 1:9 | 750° C., 1 h |
| Example 4 | Ethyl orthosilicate | 3:2 | 120° C., 3 h | Mg | 3:1 | 650° C., 4 h | Acetylene | Argon gas | 1:9 | 750° C., 1 h |
| Example 5 | Ethyl orthosilicate | 3:2 | 120° C., 3.5 h | Mg | 3:1 | 650° C., 4 h | Acetylene | Argon gas | 1:9 | 750° C., 1 h |
| Example 6 | Ethyl orthosilicate | 3:2 | 120° C., 5 h | Mg | 3:1 | 650° C., 4 h | Acetylene | Argon gas | 1:9 | 750° C., 1 h |
| Example 7 | Ethyl orthosilicate | 3:2 | 120° C., 8 h | Mg | 3:1 | 650° C., 4 h | Acetylene | Argon gas | 1:9 | 750° C., 1 h |
| Example 8 | Ethyl orthosilicate | 3:2 | 120° C., 3 h | Mg | 3:1 | 650° C., 4 h | Acetylene | Argon gas | 1:9 | 750° C., 1 h |
| Example 9 | Ethyl orthosilicate | 3:2 | 120° C., 3 h | Mg | 3:1 | 650° C., 4 h | Acetylene | Argon gas | 1:9 | 750° C., 1 h |
| Example 10 | Ethyl orthosilicate | 3:2 | 120° C., 3 h | Mg | 3:1 | 650° C., 4 h | Acetylene | Argon gas | 1:9 | 750° C., 1 h |
| Example 11 | Ethyl orthosilicate | 3:2 | 120° C., 3 h | Mg | 3:1 | 650° C., 4 h | Acetylene | Argon gas | 1:9 | 750° C., 1 h |
| Example 12 | Ethyl orthosilicate | 3:2 | 120° C., 3 h | Mg | 3:1 | 650° C., 4 h | Acetylene | Argon gas | 1:9 | 750° C., 1 h |
| Example 13 | Ethyl orthosilicate | 3:2 | 120° C., 3 h | Mg | 3:1 | 650° C., 4 h | Acetylene | Argon gas | 1:9 | 750° C., 1 h |
| Example 14 | Ethyl orthosilicate | 3:2 | 120° C., 3 h | Mg | 2:1 | 650° C., 10 h | Acetylene | Argon gas | 1:9 | 750° C., 1 h |
| Example 15 | Ethyl orthosilicate | 3:2 | 120° C., 3 h | Mg | 3:1 | 650° C., 8 h | Acetylene | Argon gas | 1:9 | 750° C., 1 h |
| Example 16 | Ethyl orthosilicate | 3:2 | 120° C., 3 h | Mg | 4:1 | 650° C., 3 h | Acetylene | Argon gas | 1:9 | 750° C., 1 h |
| Example 17 | Ethyl orthosilicate | 3:2 | 120° C., 3 h | Mg | 3:1 | 650° C., 1 h | Acetylene | Argon gas | 1:9 | 750° C., 1 h |
| Example 18 | Ethyl orthosilicate | 3:2 | 120° C., 3 h | Mg | 4:1 | 650° C., 0.5 h | Acetylene | Argon gas | 1:9 | 750° C., 1 h |
| Example 19 | Ethyl orthosilicate | 3:2 | 120° C., 3 h | Mg | 2:1 | 750° C., 6 h | Acetylene | Argon gas | 1:9 | 750° C., 1 h |
| Example 20 | Ethyl orthosilicate | 3:2 | 120° C., 3 h | Mg | 3:1 | 630° C., 3 h | Acetylene | Argon gas | 1:9 | 750° C., 1 h |

TABLE 1-2

| | Preparation of silicon-carbon material | | | Preparation of first carbon cladding layer | | | |
|---|---|---|---|---|---|---|---|
| Group | First silicon source | n1 | Temperature and time | First carbon source | First dilution gas | v1 | Temperature and time |
| Example 21 | $SiH_4$ | 4:1 | 850° C., 4 h | Acetylene | Argon gas | 1:9 | 750° C., 1 h |
| Example 22 | $SiH_4$ | 4:1 | 850° C., 4 h | Acetylene | Argon gas | 1:9 | 750° C., 1 h |
| Example 23 | $SiH_4$ | 4:1 | 850° C., 4 h | Acetylene | Argon gas | 1:9 | 750° C., 1 h |
| Example 24 | $SiH_4$ | 4:1 | 850° C., 4 h | Acetylene | Argon gas | 1:9 | 750° C., 1 h |
| Example 25 | $SiH_4$ | 4:1 | 850° C., 4 h | Acetylene | Argon gas | 1:9 | 750° C., 1 h |
| Example 26 | $SiH_4$ | 4:1 | 850° C., 4 h | Acetylene | Argon gas | 1:9 | 750° C., 1 h |
| Example 27 | $SiH_4$ | 4:1 | 850° C., 4 h | Acetylene | Argon gas | 1:9 | 750° C., 1 h |
| Example 28 | $SiH_4$ | 4:1 | 850° C., 4 h | Acetylene | Argon gas | 1:9 | 750° C., 1 h |
| Example 29 | $SiH_4$ | 4:1 | 850° C., 4 h | Acetylene | Argon gas | 1:9 | 750° C., 1 h |
| Example 30 | $SiH_4$ | 4:1 | 850° C., 4 h | Acetylene | Argon gas | 1:9 | 750° C., 1 h |
| Example 31 | $SiH_4$ | 4:1 | 850° C., 4 h | Acetylene | Argon gas | 1:9 | 750° C., 0.5 h |
| Example 32 | $SiH_4$ | 4:1 | 850° C., 4 h | Acetylene | Argon gas | 1:9 | 750° C., 2 h |
| Example 33 | $SiH_4$ | 4:1 | 850° C., 4 h | Acetylene | Argon gas | 1:9 | 750° C., 1 h |
| Example 34 | $SiH_4$ | 4:1 | 850° C., 4 h | Acetylene | Argon gas | / | / |
| Example 35 | $SiH_4$ | 4:1 | 850° C., 4 h | Acetylene | Argon gas | / | / |
| Comparative Example 1 | $SiH_4$ | 4:1 | 850° C., 4 h | Acetylene | Argon gas | 1:9 | 750° C., 1 h |

TABLE 1-2-continued

| | Preparation of silicon-containing cladding layer | | | | Preparation of second carbon cladding layer | | |
|---|---|---|---|---|---|---|---|
| Group | Second silicon source | n2 Temperature and time | Reducing agent | n3 Temperature and time | Second carbon source | Second dilution gas | v2 Temperature and time |
| Example 21 | Ethyl orthosilicate | 3:2 120° C., 3 h | Mg | 4:1 650° C., 2.5 h | Acetylene | Argon gas | 1:9 750° C., 1 h |
| Example 22 | Ethyl orthosilicate | 3:2 120° C., 3 h | Mg | 4:1 650° C., 2 h | Acetylene | Argon gas | 1:9 750° C., 1 h |
| Example 23 | Ethyl orthosilicate | 3:2 120° C., 3 h | Mg | 3:1 650° C., 4 h | Acetylene | Argon gas | 1:9 750° C., 1 h |
| Example 24 | Ethyl orthosilicate | 3:2 120° C., 3 h | Mg | 3:1 650° C., 4 h | Acetylene | Argon gas | 1:9 750° C., 1 h |
| Example 25 | Ethyl orthosilicate | 3:2 120° C., 3 h | Mg | 3:1 650° C., 4 h | Acetylene | Argon gas | 1:9 750° C., 1 h |
| Example 26 | Ethyl orthosilicate | 3:2 120° C., 3 h | Mg | 3:1 650° C., 4 h | Acetylene | Argon gas | 1:9 750° C., 1 h |
| Example 27 | Ethyl orthosilicate | 3:2 120° C., 3 h | Mg | 3:1 650° C., 4 h | Acetylene | Argon gas | 1:9 750° C., 1 h |
| Example 28 | Ethyl orthosilicate | 3:2 120° C., 3 h | Mg | 3:1 650° C., 4 h | Acetylene | Argon gas | 1:9 750° C., 1 h |
| Example 29 | Ethyl orthosilicate | 3:2 120° C., 3 h | Mg | 3:1 650° C., 4 h | Acetylene | Argon gas | 1:9 750° C., 1 h |
| Example 30 | Ethyl orthosilicate | 3:2 120° C., 3 h | Mg | 3:1 650° C., 4 h | Acetylene | Argon gas | 1:9 750° C., 1 h |
| Example 31 | Ethyl orthosilicate | 3:2 120° C., 3 h | Mg | 3:1 650° C., 4 h | Acetylene | Argon gas | 1:9 750° C., 0.5 h |
| Example 32 | Ethyl orthosilicate | 3:2 120° C., 3 h | Mg | 3:1 650° C., 4 h | Acetylene | Argon gas | 1:9 750° C., 2 h |
| Example 33 | Ethyl orthosilicate | 3:2 120° C., 3 h | Mg | 3:1 650° C., 4 h | Acetylene | Argon gas | / / |
| Example 34 | Ethyl orthosilicate | 3:2 120° C., 3 h | Mg | 3:1 650° C., 4 h | Acetylene | Argon gas | 1:9 750° C., 1 h |
| Example 35 | Ethyl orthosilicate | 3:2 120° C., 3 h | Mg | 3:1 650° C., 4 h | Acetylene | Argon gas | / / |
| Comparative Example 1 | / | / / | / | / / | / | / | / / |

Among them, n1 represents the molar ratio of porous carbon to the first silicon source, n2 represents the mass ratio of the silicon-carbon material cladded with the first carbon cladding layer to the second silicon source, n3 represents the mass ratio of the intermediate with the silicon dioxide cladding layer to the reducing agent, v1 represents the volume ratio of the first carbon source to the first dilution gas, and v2 represents the volume ratio of the second carbon source to the second dilution gas.

Comparative Example 2

The difference between Comparative Example 2 and Example 4 is that only the silicon-containing material and the second carbon cladding layer cladded on the outer side of the silicon-containing material are prepared, and the silicon-carbon material and the first carbon cladding layer cladded on the outer side of the silicon-carbon material are not contained. The specific preparation process is as follows:
mixing pure SiO2 and Mg powder (the mixing mass ratio being 3:1), fully grinding and mixing in a mortar, heating in a 650° C. tubular furnace in an inert gas atmosphere for 2 h, cooling to room temperature, washing with 0.5 M hydrochloric acid to remove MgO and unreacted Mg, washing with deionized water to neutrality, and then vacuum drying at 70° C. for 12 h; then placing back into the rotary kiln, introducing argon gas for purging for 30 min, heating to 700° C. at 10° C./min, and then switching to a mixed gas of acetylene/ Ar (the volume ratio of acetylene to argon gas being 1:9), keeping that temperature for 30 min, and cooling to obtain a C/SiOx composite material with a deposition thickness of carbon cladding layer of 10 nm.

Comparative Example 3 step 1: mixing pure SiO2 and Mg powder (the mixing mass ratio being 3:1), fully grinding and mixing in a mortar, heating in a 650° C. tubular furnace in an inert gas atmosphere for 2 h, cooling to room temperature, washing with 0.5 M hydrochloric acid to remove MgO and unreacted Mg, washing with deionized water to neutrality, and then vacuum drying at 70° C. for 12 h; then placing back into the rotary kiln, introducing argon gas for purging for 30 min, heating to 700° C. at 10° C./min, and then switching to a mixed gas of acetylene/ Ar (the volume ratio of acetylene to argon gas being 1:9), keeping that temperature for 30 min, and cooling to obtain a C/SiOx composite material with a deposition thickness of silicon oxide layer of 10 nm.

Step 2: adding 2 g of o-aminobenzenesulfonic acid and 2 g of lignin powder to the C/SiOx composite material obtained above, dispersing in 150 mL of deionized water, mixing thoroughly, transferring to a hydrothermal autoclave at 110° C. to react for 8 h, centrifuging the obtained solution and washing, and drying in a vacuum drying oven at 60° C. overnight.

Step 3: activating the solid powder obtained above in a KOH solution with a mass fraction of 50% for 12 h (impregnation ratio of 1:3), then oven-drying at 60° C., and then placing in a tubular furnace and keeping at 700° C. under an argon atmosphere for 2 h; after cooling, washing several times with 1.0 mol/L HCl to remove inorganic impurities, and then washing with deionized water until the filtrate was neutral, and finally vacuum drying at 60° C. for 12 h to obtain the C/Si—C@C/SiOx composite material.

The parameters of the composite silicon materials prepared in the above Examples and Comparative Examples were measured, specifically including:

the mass percentage of silicon element in the silicon-carbon material, the pore size of pores of the porous carbon, the stacking height of the first silicon-based material in the pores, the thickness of the first cladding layer, the thickness of the silicon-containing cladding layer, the molar ratio of oxygen to silicon elements contained in the silicon oxide, the volume average particle size Dv50 of the second silicon-based material contained in the silicon oxide, the thickness of the second carbon cladding layer and the volume average particle size Dv50 of the composite silicon material, as shown in Table 2 for details.

based material contained in the silicon oxide, d4 represents the volume average particle size Dv50 of the composite silicon material, L1 represents the thickness of the first carbon cladding layer, L2 represents the thickness of the silicon-containing cladding layer, and L3 represents the thickness of the second carbon cladding layer.

It should be noted that the above-mentioned mass percentage of silicon element in the silicon-carbon material is measured by EDS energy spectrum.

The above-mentioned pore size of pores of the porous carbon is measured with a specific surface area analysis tester in accordance with GB/T 19587-2017 gas adsorption BET method.

The above-mentioned stacking height of the first silicon-based material in the pores is measured by transmission electron microscopy (TEM).

The thickness of the above-mentioned first carbon cladding layer is measured by transmission electron microscopy (TEM).

The molar ratio of oxygen to silicon elements contained in the silicon oxide mentioned above is determined by the

TABLE 2

| Group | Silicon-carbon material | | | First carbon cladding layer | Silicon-containing cladding layer | | | Second carbon cladding layer | Composite silicon material |
|---|---|---|---|---|---|---|---|---|---|
| | w1 | d1 | d2 | L1 | w2 | d3 | L2 | L3 | d4 |
| Example 1 | 9% | 20 nm | 12 nm | 15 nm | 0.6 | 7 nm | 4 nm | 15 nm | 7 μm |
| Example 2 | 9% | 20 nm | 12 nm | 15 nm | 0.6 | 7 nm | 5 nm | 15 nm | 7 μm |
| Example 3 | 9% | 20 nm | 12 nm | 15 nm | 0.6 | 7 nm | 30 nm | 15 nm | 7 μm |
| Example 4 | 9% | 20 nm | 12 nm | 15 nm | 0.6 | 7 nm | 50 nm | 15 nm | 7 μm |
| Example 5 | 9% | 20 nm | 12 nm | 15 nm | 0.6 | 7 nm | 60 nm | 15 nm | 7 μm |
| Example 6 | 9% | 20 nm | 12 nm | 15 nm | 0.6 | 7 nm | 100 nm | 15 nm | 7 μm |
| Example 7 | 9% | 20 nm | 12 nm | 15 nm | 0.6 | 7 nm | 140 nm | 15 nm | 7 μm |
| Example 8 | 2% | 20 nm | 4 nm | 15 nm | 0.6 | 7 nm | 50 nm | 15 nm | 7 μm |
| Example 9 | 3% | 20 nm | 5 nm | 15 nm | 0.6 | 7 nm | 50 nm | 15 nm | 7 μm |
| Example 10 | 8% | 20 nm | 10 nm | 15 nm | 0.6 | 7 nm | 50 nm | 15 nm | 7 μm |
| Example 11 | 10% | 20 nm | 13 nm | 15 nm | 0.6 | 7 nm | 50 nm | 15 nm | 7 μm |
| Example 12 | 25% | 40 nm | 35 nm | 15 nm | 0.6 | 7 nm | 50 nm | 15 nm | 7 μm |
| Example 13 | 27% | 40 nm | 39 nm | 15 nm | 0.6 | 7 nm | 50 nm | 15 nm | 7 μm |
| Example 14 | 9% | 20 nm | 12 nm | 15 nm | 0.1 | 7 nm | 50 nm | 15 nm | 7 μm |
| Example 15 | 9% | 20 nm | 12 nm | 15 nm | 0.3 | 7 nm | 50 nm | 15 nm | 7 μm |
| Example 16 | 9% | 20 nm | 12 nm | 15 nm | 1 | 7 nm | 50 nm | 15 nm | 7 μm |
| Example 17 | 9% | 20 nm | 12 nm | 15 nm | 1.5 | 7 nm | 50 nm | 15 nm | 7 μm |
| Example 18 | 9% | 20 nm | 12 nm | 15 nm | 1.9 | 7 nm | 50 nm | 15 nm | 7 μm |
| Example 19 | 9% | 20 nm | 12 nm | 15 nm | 0.6 | 2 nm | 50 nm | 15 nm | 7 μm |
| Example 20 | 9% | 20 nm | 12 nm | 15 nm | 0.6 | 9 nm | 50 nm | 15 nm | 7 μm |
| Example 21 | 9% | 20 nm | 12 nm | 15 nm | 0.6 | 20 nm | 50 nm | 15 nm | 7 μm |
| Example 22 | 9% | 20 nm | 12 nm | 15 nm | 0.6 | 22 nm | 50 nm | 15 nm | 7 μm |
| Example 23 | 9% | 20 nm | 12 nm | 15 nm | 0.6 | 7 nm | 50 nm | 15 nm | 2 μm |
| Example 24 | 9% | 20 nm | 12 nm | 15 nm | 0.6 | 7 nm | 50 nm | 15 nm | 3 μm |
| Example 25 | 9% | 20 nm | 12 nm | 15 nm | 0.6 | 7 nm | 50 nm | 15 nm | 5 μm |
| Example 26 | 9% | 20 nm | 12 nm | 15 nm | 0.6 | 7 nm | 50 nm | 15 nm | 10 μm |
| Example 27 | 9% | 20 nm | 12 nm | 15 nm | 0.6 | 7 nm | 50 nm | 15 nm | 22 μm |
| Example 28 | 9% | 20 nm | 12 nm | 15 nm | 0.6 | 7 nm | 50 nm | 15 nm | 25 μm |
| Example 29 | 9% | 2 nm | 12 nm | 15 nm | 0.6 | 7 nm | 50 nm | 15 nm | 7 μm |
| Example 30 | 9% | 50 nm | 12 nm | 15 nm | 0.6 | 7 nm | 50 nm | 15 nm | 7 μm |
| Example 31 | 9% | 20 nm | 12 nm | 10 nm | 0.6 | 7 nm | 50 nm | 10 nm | 7 μm |
| Example 32 | 9% | 20 nm | 12 nm | 30 nm | 0.6 | 7 nm | 50 nm | 30 nm | 7 μm |
| Example 33 | 9% | 20 nm | 12 nm | 15 nm | 0.6 | 7 nm | 50 nm | / | 7 μm |
| Example 34 | 9% | 20 nm | 12 nm | / | 0.6 | 7 nm | 50 nm | 15 nm | 7 μm |
| Example 35 | 9% | 20 nm | 12 nm | / | 0.6 | 7 nm | 50 nm | / | 7 μm |
| Comparative Example 1 | 9% | 20 nm | 12 nm | 15 nm | / | / | / | / | |

Among them, w1 represents the mass percentage of silicon element in the silicon-carbon material, w2 represents the molar ratio of oxygen element to silicon element contained in the silicon oxide, d1 represents the pore size of pores of the porous carbon, d2 represents the stacking height of first silicon-based material in the pores, d3 represents the volume average particle size Dv50 of the second silicon-following method: perform X-ray energy dispersive spectroscopy on the composite silicon material, deduct the silicon content in the silicon-carbon material, and qualitatively determine the X value in the silicon oxide.

The above-mentioned volume average particle size Dv50 of the second silicon-based material contained in the silicon oxide is measured by using a Mastersizer 2000E laser particle size analyzer of Malvern Instruments Co., Ltd. in the UK with reference to GB/T 19077-2016 particle size distribution laser diffraction method.

The thickness of the above-mentioned silicon-containing cladding layer is measured by transmission electron microscopy (TEM).

The thickness of the above-mentioned second carbon cladding layer is measured by transmission electron microscopy (TEM).

The above-mentioned volume average particle size Dv50 of the composite silicon material is measured by using a Mastersizer 2000E laser particle size analyzer of Malvern Instruments Co., Ltd. in the UK with reference to GB/T 19077-2016 particle size distribution laser diffraction method.

It should be noted that since the volume average particle size Dv50 of the composite silicon material is at the micron level, the thickness of the first carbon cladding layer, the thickness of the silicon-containing cladding layer, and the thickness of the second carbon cladding layer are only at the nanometer level, so the fluctuations in the thickness of the first carbon cladding layer, the thickness of the silicon-containing cladding layer, and the thickness of the second carbon cladding layer have very little effect on the volume average particle size Dv50 of the composite silicon material and can be ignored.

II. Preparation of Negative Electrode Plate and Secondary Battery

1. Preparation of Negative Electrode Plate

The silicon-based materials prepared in the above Examples and Comparative Examples were respectively mixed with conductive carbon, sodium carboxymethyl cellulose (CMC) and styrene-butadiene rubber (SBR) according to a mass ratio of 10:85:1:1, and then water was added and stirred uniformly to prepare negative electrode slurry. The negative electrode slurry was evenly applied on both sides of a 6 μm-thick copper foil with an areal density of single-side applying of 130 mg/1540.25 mm$^2$. After drying in an oven and cold pressing, the foil was die-cut with a cutting width of 43.5 mm to obtain the negative electrode plate for a lithium ion battery.

2. Preparation of Positive Electrode Plate

The positive electrode active substance ternary material nickel-cobalt-manganese (NCM811), the conductive agent acetylene black, and the binder polyvinylidene fluoride (PVDF) were added to N-methylpyrrolidone (NMP) at a mass ratio of 97:2:1. After uniform stirring, a positive electrode slurry was prepared. The positive electrode slurry was uniformly applied onto a 15 μm-thick aluminum foil with an areal density of 320 mg/1540.25 mm$^2$. After oven-drying and cold pressing, the foil was die-cut with a slitting width of 40 mm, to obtain the positive electrode plate for a lithium-ion battery.

3. Preparation of Separator

Polyethylene was used as the base film, and a 3 μm-thick layer of aluminum oxide was applied on the base film to obtain the separator.

4. Preparation of Electrolyte Solution

Ethylene carbonate (EC), dimethyl carbonate (DMC) and diethyl carbonate (DEC) were mixed according to a volume ratio of 1:1:1, and then $LiPF_6$ was evenly dissolved in the above solution to obtain the electrolyte solution. The concentration of $LiPF_6$ in the electrolyte solution was 1 mol/L.

The aforementioned positive electrode plate, separator and negative electrode plate were stacked in sequence, so that the separator was placed between the positive electrode plate and the negative electrode plate to play a role of isolation, and then after packaging, liquid injection, formation, and other processes, a lithium-ion battery was produced.

It should be noted that the formation process in the above preparation process of lithium-ion battery is: first charge to 3.0V at 0.02 C, then charge to 3.4V at 0.1 C, and finally charge to 3.9V at 0.2 C.

III. Performance Test of Negative Electrode Plate and Secondary Battery

1. Electrode Plate Rebound Rate Test

After fully charged, the secondary battery was disassembled, and the rebound rate of the negative electrode plate was tested. The rebound rate of electrode plate=(thickness of the fully charged electrode plate/thickness of the cold pressed electrode plate−1)*100%. The results are detailed in Table 3.

Full charge process: the battery was allowed to stand for 30 minutes, then charged at a rate of 0.5 C to a voltage of 4.25V, further charged at a constant voltage of 4.25V to a current of 0.05 C, and allowed to stand for 5 minutes.

2. Fast Charge Capacity Test

The negative electrode plates and the single-sided positive electrode plates prepared in the above Examples and Comparative Examples were respectively assembled into three-electrode small stacks, and their lithium plating windows were tested and their fast charge capabilities (10~80% SOC) were calculated;

Fast charge capacity =

$$60*0.1/(C_{20\%} + C_{30\%} + C_{40\%} + C_{50\%} + C_{60\%} + C_{70\%} + C_{80\%})$$

Among them, $C_{xx\%}$ represents the maximum charging rate at the corresponding SOC; for example, $C_{20\%}$ represents the maximum charging rate at 20% SOC. The results are detailed in Table 3.

3. Cycling Capacity Retention Rate Test

Test condition: under the room temperature condition, the secondary battery was charged at a rate of 0.5 C and discharged at a rate of 0.5 C, and subjected to 300 cycles of full-charge and full-discharge test.

Test procedure: the battery is allowed to stand for 30 minutes, then charged at a rate of 0.5 C to a voltage of 4.25V, further charged at constant voltage of 4.25V until the current reached 0.05 C, allowed to stand for 5 minutes, and then discharged at a rate of 0.5 C to a voltage of 2.5V. This constitutes one charge/discharge cycle. The discharge capacity was recorded during each cycle.

Capacity retention ratio after 300 cycles (%) =

(Discharge capacity at the

300th cycle/Discharge capacity at the first cycle) × 100%.

The results are detailed in Table 3.

TABLE 3

| Group | Negative electrode plate rebound rate | Fast charge time (min) | Capacity retention rate after 300 cycles |
| --- | --- | --- | --- |
| Example 1 | 35.50% | 22.8 | 94.60% |
| Example 2 | 36.00% | 22.7 | 94.70% |
| Example 3 | 39.10% | 22.4 | 95.00% |
| Example 4 | 40.60% | 22.1 | 95.40% |
| Example 5 | 41.30% | 21.8 | 95.10% |
| Example 6 | 43.60% | 21.6 | 94.30% |
| Example 7 | 46.30% | 21.2 | 93.30% |
| Example 8 | 40.30% | 21.6 | 93.10% |
| Example 9 | 40.10% | 21.7 | 93.80% |
| Example 10 | 40.60% | 22.2 | 95.10% |
| Example 11 | 41.20% | 22.1 | 95.00% |
| Example 12 | 44.30% | 23.3 | 93.50% |
| Example 13 | 45.70% | 23.6 | 92.60% |
| Example 14 | 46.90% | 24.3 | 92.90% |
| Example 15 | 46.30% | 23.8 | 94.20% |
| Example 16 | 40.30% | 22.6 | 93.90% |
| Example 17 | 37.80% | 22 | 93.60% |
| Example 18 | 36.20% | 21.7 | 93.40% |
| Example 19 | 40.50% | 21.8 | 95.40% |
| Example 20 | 40.60% | 22.1 | 95.20% |
| Example 21 | 41.90% | 22.8 | 94.30% |
| Example 22 | 42.80% | 23.1 | 94.00% |
| Example 23 | 40.60% | 21.2 | 94.20% |
| Example 24 | 40.50% | 21.4 | 94.40% |
| Example 25 | 40.80% | 21.9 | 94.90% |
| Example 26 | 40.50% | 22.4 | 95.30% |
| Example 27 | 40.30% | 23.1 | 95.20% |
| Example 28 | 40.80% | 23.3 | 95.10% |
| Example 29 | 45.30% | 23.8 | 93.10% |
| Example 30 | 40.80% | 22.7 | 94.60% |
| Example 31 | 40.60% | 22.4 | 95.30% |
| Example 32 | 40.90% | 21.8 | 95.40% |
| Example 33 | 43.20% | 24.5 | 93.10% |
| Example 34 | 41.40% | 23.7 | 93.80% |
| Example 35 | 45.30% | 24.9 | 92.30% |
| Comparative Example 1 | 35.00% | 25.9 | 92.80% |
| Comparative Example 2 | 48.50% | 21.5 | 91.30% |
| Comparative Example 3 | 43.70% | 26.1 | 92.10% |

From the comparison of the results of Examples 1-35 and Comparative Examples 1-3 in Table 3, it can be seen that in the present application, by using a silicon-carbon material and a silicon-containing cladding layer including an ion-conducting material and a second silicon-based material in combination, and cladding the silicon-containing cladding layer on the outer side of the silicon-carbon material to form a composite silicon material, the volume expansion of the negative electrode plate can be reduced, and the fast charge performance and cycling performance of the secondary battery can be improved.

The difference between Examples 1-7 is that the thickness of the silicon-containing cladding layer is different. The thickness of the silicon-containing cladding layer in Example 1 is the smallest, and the thickness of the silicon-containing cladding layer in Example 7 is the largest. Compared with Examples 2-6, the fast charge time in Example 1 is extended. The technicians analyzed that the reason may be that: when the thickness of the silicon-containing cladding layer is too low, the ion transmission path may increase limitedly, and the dynamic performance of the composite silicon material may be correspondingly poor. Compared with Examples 2-6, the rebound rate of the negative electrode plate in Example 7 is significantly increased, and the cycling capacity retention rate is significantly reduced. The technicians analyzed that the reason may be that: when the thickness of the silicon-containing cladding layer is too high, the overall silicon content of the loaded silicon material is too high, which may cause the composite silicon material to expand too much, and may further cause the SEI film on the surface of the composite silicon material to be damaged, and in that case, the electrolyte solution consumes active lithium to continuously repair the SEI film at the damaged interface, which will deteriorate the cycling performance.

The difference between Example 4 and Examples 8-13 mainly lies in the mass percentage of silicon element in the silicon-carbon material and the stacking height of the first silicon-based material in the pores. The mass percentage of silicon element in the silicon-carbon material and the stacking height of the first silicon-based material in the pores of Example 8 are the smallest, and the mass percentage of silicon element in the silicon-carbon material and the stacking height of the first silicon-based material in the pores of Example 13 are the largest. Compared with Examples 4 and Examples 9-12, the fast charge time in Example 13 is longer and the cycling capacity retention rate is significantly reduced. The technicians analyzed that the reason may be that: the mass percentage of silicon element in the silicon-carbon material is too large, which may cause the conductivity of the silicon-carbon material particles to drop sharply, and then result in a decrease in fast charge performance and capacity attenuation, and a decrease in cycling performance. Compared with Example 4 and Examples 9-12, the cycling capacity retention rate in Example 8 is significantly reduced. The technicians analyzed that the reason may be that: when the mass percentage of silicon element in the silicon-carbon material is too small, the internal space of the silicon-carbon material particles may be large after lithiation, and the mechanical strength of the silicon-carbon material particles is low. The composite silicon material may be easily broken under long-term high expansion during cycling, resulting in contact between the electrolyte solution and the internal silicon, increased side reactions, and a decrease in the cycling capacity retention rate; it should be noted that since the mass percentage of silicon element in the silicon-carbon material of Example 8 is relatively small, the gram capacity and energy density of the composite silicon material finally prepared are reduced.

The main difference between Example 4 and Examples 14-18 lies in the different molar ratios of oxygen to silicon elements in silicon oxide. From the results of Examples 4 and 14-18, it can be seen that when the molar ratio x of oxygen to silicon elements in silicon oxide is 0.6, the gram capacity of silicon oxide is relatively high and the volume expansion of silicon oxide during cycling is small, there are few side reactions, the cycling performance is excellent, and more ion channels can be provided. Therefore, when x is 0.6, the composite silicon material can take into account both volume expansion and cycling performance as well as fast charge performance.

The main difference between Example 4 and Examples 19-22 is that the volume average particle size Dv50 of the second silicon-based material contained in the silicon oxide is different. The volume average particle size Dv50 of the second silicon-based material in Example 22 is the largest; from the results of Examples 4 and Examples 19-23, it can be seen that when the volume average particle size Dv50 of the second silicon-based material contained in the silicon oxide is 2-20 nm, the active specific surface area of the second silicon-based material is large and the dynamic performance is better; at the same time, due to the small particle size of the second silicon-based material, the strain caused by different lithium concentrations is smaller, and the silicon oxide can withstand greater strain without rupture, and there are few side reactions, so that the composite silicon material has good fast charge capability and cycling performance, and excellent dynamic performance.

The difference between Example 4 and Examples 23-28 mainly lies in the different volume average particle size Dv50 of the composite silicon material. The volume average particle size Dv50 of the composite silicon material in Example 23 is the smallest, and the volume average particle size Dv50 of the composite silicon material in Example 28 is the largest; compared with Example 4 and Examples 24-27, the cycling capacity retention rate in Example 23 is reduced, and the fast charge time in Example 28 is extended; from the comparison of the above results, it can be seen that when the volume average particle size Dv50 of the composite silicon material is in the range of 3 μm to 22 μm, the composite silicon material has a large active specific surface area and good dynamic performance; at the same time, due to its small particle size, it can withstand greater strain without rupture, and has few side reactions, and thus the composite silicon material has excellent cycling performance and fast charge performance.

The main difference between Example 4 and Examples 33-35 is that the settings of the first carbon cladding layer and/or the second carbon cladding layer are different; from the comparison of the results of Example 4 and Examples 33-35, it can be seen that by setting the first carbon cladding layer and/or the second carbon cladding layer, the cycling performance and fast charge performance of the composite silicon material can be improved.

The technical features of the embodiments described above can be combined arbitrarily. In order to make the description concise, not all possible combinations of the technical features in the above embodiments are described. However, all the combinations of the technical features should be considered as falling within the scope described in the specification provided that they do not conflict with each other.

The above-mentioned embodiments only describe several embodiments of the present application, and the description thereof is specific and detailed, but cannot therefore be understood as a limitation on the patent scope of the present application. It should be noted that those of ordinary skill in the art may further make variations and improvements without departing from the concept of the present application, all of which fall within the scope of protection of the present application. Therefore, the scope of protection of the present patent application shall be subject to the appended claims.

What is claimed is:

1. A composite silicon material, comprising:
an inner core, the inner core comprising a silicon-carbon material, the silicon-carbon material comprising a porous conductive material and a first silicon-based material, the porous conductive material having pores on its outer surface, and at least a portion of the first silicon-based material being distributed in the pores;
a silicon-containing cladding layer cladded on the outer side of the inner core, the silicon-containing cladding layer comprising an ion-conducting material and a second silicon-based material, and the second silicon-based material being dispersed in the ion-conducting material; and
a first carbon cladding layer, wherein the first carbon cladding layer is located between the inner core and the silicon-containing cladding layer.

2. The composite silicon material according to claim 1, wherein the silicon-containing cladding layer has at least one of the following characteristics:
(1) the silicon-containing cladding layer has a thickness of 5 nm to 100 nm;
(2) the ion-conducting material comprises one or more of hard carbon, soft carbon, graphite, transition metal nitride, silicon-based alloy, tin-based alloy and lithium metal;
(3) the ion-conducting material and the second silicon-based material are compounded into silicon oxide;
(4) the volume average particle size Dv50 of the second silicon-based material is 2 nm to 20 nm;
(5) the second silicon-based material comprises one or more of elemental silicon and silicon-tin alloy; and
(6) the shape of the second silicon-based material comprises one or more of the following: granular, linear, spherical, quasi-spherical, and sheet-like.

3. The composite silicon material according to claim 2, wherein the thickness of the silicon-containing cladding layer is 30 nm to 60 nm.

4. The composite silicon material according to claim 2, wherein the molar ratio of oxygen element to silicon element contained in the silicon oxide is denoted as x, and $0<x\leq0.6$.

5. The composite silicon material according to claim 2, wherein the volume average particle size Dv50 of the second silicon-based material is 2 nm to 9 nm.

6. The composite silicon material according to claim 1, wherein the silicon-carbon material has at least one of the following characteristics:
(1) the mass percentage of silicon element in the silicon-carbon material is 3% to 25%;
(2) the pore size of the pores is 2 nm to 50 nm;
(3) the stacking height of the first silicon-based material in the pores is 1 nm to 35 nm;
(4) the shape of the silicon-carbon material comprises one or more of granular, spherical and quasi-spherical;
(5) the first silicon-based material comprises one or more of elemental silicon and silicon-tin alloy;
(6) the shape of the first silicon-based material comprises one or more of the following: granular, linear, spherical, quasi-spherical, and sheet-like; and
(7) the porous conductive material comprises porous carbon.

7. The composite silicon material according to claim 6, wherein the mass percentage of silicon element in the silicon-carbon material is 8% to 10%.

8. The composite silicon material according to claim 6, wherein the pore size of the pores is 15 nm to 35 nm.

9. The composite silicon material according to claim 8, wherein the stacking height of the first silicon-based material in the pores is 15 nm to 25 nm.

10. The composite silicon material according to claim 1, wherein at least 3% of the first silicon-based material is embedded in the pores.

11. The composite silicon material according to claim 10, wherein all the first silicon-based material is embedded in the pores.

12. The composite silicon material according to claim 1, wherein the first carbon cladding layer has at least one of the following characteristics:

(1) the first carbon cladding layer has a thickness of 10 nm to 30 nm; and (2) the material of the first carbon cladding layer comprises amorphous carbon.

13. The composite silicon material according to claim 1, wherein the composite silicon material further comprises a second carbon cladding layer, and the second carbon cladding layer is cladded on the outer side of the silicon-containing cladding layer.

14. The composite silicon material according to claim 13, wherein the second carbon cladding layer has at least one of the following characteristics:

(1) the second carbon cladding layer has a thickness of 10 nm to 30 nm; and (2) the material of the second carbon cladding layer comprises amorphous carbon.

15. The composite silicon material according to claim 1, wherein the shape of the composite silicon material comprises one or more of granular, spherical and quasi-spherical.

16. The composite silicon material according to claim 15, wherein the volume average particle size Dv50 of the composite silicon material is 3 μm to 22 μm.

17. The composite silicon material according to claim 16, wherein the volume average particle size Dv50 of the composite silicon material is 5 μm to 10 μm.

18. A secondary battery, comprising the composite silicon material according to claim 1.

19. An electrical apparatus, comprising the secondary battery according to claim 18.

* * * * *